(12) United States Patent
Baijal et al.

(10) Patent No.: US 11,640,650 B2
(45) Date of Patent: May 2, 2023

(54) COMPUTING APPARATUS AND OPERATION METHOD OF THE SAME

(71) Applicant: SAMSUNG ELECTRONICS CO., LTD., Suwon-si (KR)

(72) Inventors: Anant Baijal, Suwon-si (KR); Vivek Agarwal, Suwon-si (KR); Jayoon Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/030,905

(22) Filed: Sep. 24, 2020

(65) Prior Publication Data

US 2021/0118093 A1    Apr. 22, 2021

(30) Foreign Application Priority Data

Oct. 16, 2019    (KR) ......................... 10-2019-0128719

(51) Int. Cl.
| | |
|---|---|
| G06K 9/00 | (2022.01) |
| G06T 3/40 | (2006.01) |
| G06T 7/11 | (2017.01) |
| G06T 7/174 | (2017.01) |
| G06N 3/084 | (2023.01) |
| G06V 10/40 | (2022.01) |

(52) U.S. Cl.
CPC .......... *G06T 3/4038* (2013.01); *G06N 3/084* (2013.01); *G06T 7/11* (2017.01); *G06T 7/174* (2017.01); *G06V 10/40* (2022.01); *G06T 2207/20081* (2013.01); *G06T 2207/20084* (2013.01); *G06T 2207/20212* (2013.01)

(58) Field of Classification Search
CPC .................................................. G06T 3/4038
See application file for complete search history.

(56) References Cited

U.S. PATENT DOCUMENTS 6,137,498 A    10/2000  Silvers
6,927,874 B1    8/2005  Enokida et al.
(Continued)

FOREIGN PATENT DOCUMENTS

CN    109215123    2/2019
CN    109360156    2/2019

OTHER PUBLICATIONS

Machine translation of CN109360156B (Year: 2019).*
(Continued)

*Primary Examiner* — Hadi Akhavannik
(74) *Attorney, Agent, or Firm* — Nixon & Vanderhye P.C.

(57) ABSTRACT

Provided are a computing apparatus for constructing a mosaic image and an operation method of the same. The computing apparatus includes: a memory storing one or more instructions; and a processor configured to execute the one or more instructions stored in the memory to: segment an input image into a plurality of sub areas to obtain a plurality of sub area images, extract a feature from each of the plurality of sub area images, generate a plurality of source images respectively corresponding to the plurality of sub areas using an image generation neural network, the image generation neural network using, as a condition, the feature extracted from each of the plurality of sub area images, and combine the plurality of source images respectively corresponding to the plurality of sub areas to generate a mosaic image.

20 Claims, 19 Drawing Sheets

(56) References Cited

U.S. PATENT DOCUMENTS

| | | | | |
|---|---|---|---|---|
| 8,436,853 | B1* | 5/2013 | Hickman | G06T 17/00 345/419 |
| 8,515,137 | B2 | 8/2013 | Richards et al. | |
| 9,058,673 | B2 | 6/2015 | Chen et al. | |
| 9,798,612 | B1* | 10/2017 | Foerster | G06T 5/002 |
| 10,198,804 | B2* | 2/2019 | Sungkorn | G06V 10/462 |
| 2009/0214110 | A1* | 8/2009 | Son | G06T 3/4038 382/164 |
| 2019/0019589 | A1* | 1/2019 | Waite | G06T 7/0008 |
| 2019/0065905 | A1* | 2/2019 | Rephaeli | G06T 7/0012 |

OTHER PUBLICATIONS

European Search Report and Written Opinion dated Mar. 11, 2021 in corresponding European Application No. 20201842.0.

Wei Sun et al: "Image Synthesis Reconfigurable Layout and Style", arxiv.org, Cornell University Library, 201 Olin Library Cornell University Ithaca, NY 14853, Aug. 20, 2019 (Aug. 20, 2019), XP081466217.

Phillip Isola et al: "Image-to-Image Translation with Conditional Adversarial Networks", arxiv.org, Cornell University Library, 201 Olin Library Cornell University Ithaca, NY 14853, Nov. 21, 2016 (Nov. 21, 2016), XP080733474, DOI: 10.1109/CVPR.2017.632.

Antonia Creswell et al: "Generative Adversarial Networks: An Overview", arxiv.org, Cornell University Library, 201 Olin Library Cornell University Ithaca, NY 14853, Oct. 19, 2017 (Oct. 19, 2017), XP081296319, DOI: 10.1109/MSP.2017.2765202.

European Office Action dated Mar. 15, 2023 for EP Application No. 20201842.0.

Holger et al., "COCO-Stuff: Thing and Stuff Classes in Context", 2018 IEEE/CVF Conference on Computer Vision and Pattern Recognition, Jun. 18, 2018, pp. 1209-1218.

* cited by examiner

COMPUTING APPARATUS AND OPERATION METHOD OF THE SAME

CROSS-REFERENCE TO RELATED APPLICATION

This application is based on and claims priority under 35 U.S.C. § 119 to Korean Patent Application No. 10-2019-0128719, filed on Oct. 16, 2019, in the Korean Intellectual Property Office, the disclosure of which is incorporated by reference herein in its entirety.

BACKGROUND

1. Field

The disclosure relates to a computing apparatus and an operation method of the computing apparatus, and for example, to a computing apparatus for performing a function of processing a mosaic image and an operation method of the computing apparatus.

2. Description of Related Art

Image mosaic construction refers to arranging a plurality of small source images on a base image to construct a mosaic.

In general, to construct a mosaic image, a computing apparatus prepares a base image as a target and a plurality of small source images that will construct a mosaic, and arranges the source images on areas of the base image by reflecting a feature of the base image to construct a mosaic image.

However, a method for actively constructing a mosaic image even when there is neither a base image as a target nor a source image to construct a mosaic is needed.

SUMMARY

Embodiments of the disclosure provide a computing apparatus and method capable of generating a mosaic image using a base image without source images.

Embodiments of the disclosure provide a computing apparatus and method capable of generating a mosaic image without using a base image as well as source images.

Embodiments of the disclosure provide a computing apparatus and method capable of generating a mosaic image using a template of the mosaic image to be generated, without using a base image as well as source images.

Additional aspects will be set forth in part in the description which follows and, in part, will be apparent from the description.

A computing apparatus according to an example embodiment of the disclosure includes: a memory storing one or more instructions; and a processor configured to execute the one or more instructions stored in the memory to: obtain a plurality of sub area images by segmenting an input image into a plurality of sub areas, extract a feature from each of the plurality of sub area images, generate a plurality of source images respectively corresponding to the plurality of sub areas using an image generation neural network, the image generation neural network using, as a condition, the feature extracted from each of the plurality of sub area images, and generate a mosaic image by combining the plurality of source images respectively corresponding to the plurality of sub areas.

According to an example embodiment of the disclosure, the processor may be further configured to execute the one or more instructions to extract the feature of each of the plurality of sub area images from each of the plurality of sub area images using a feature extraction neural network.

According to an example embodiment of the disclosure, the feature of each of the plurality of sub area images may include at least one of color, texture, or geometric information.

According to an example embodiment of the disclosure, the image generation neural network may include a generative adversarial network (GAN).

A computing apparatus according to an example embodiment of the disclosure includes: a memory storing one or more instructions; and a processor configured to execute the one or more instructions stored in the memory to: segment an empty image into a plurality of sub areas, generate a plurality of source images respectively corresponding to the plurality of sub areas using an image generation neural network, and generate a mosaic image by combining the plurality of source images respectively corresponding to the plurality of sub areas, wherein to generate the plurality of source images the processor is configured to execute the one or more instructions stored in the memory to: obtain an esthetics score of a previously generated source image by evaluating esthetics of the previously generated source image, and generate the plurality of source images respectively corresponding to the plurality of sub areas using the image generation neural network, the image generation neural network using, as a condition, the esthetics score of the previously generated source image.

According to an example embodiment of the disclosure, the processor may be further configured to execute the one or more instructions to: evaluate, based on obtaining the esthetics score of the previously generated source image, the esthetics of the previously generated source image based on the previously generated source image and a partially completed mosaic image.

According to an example embodiment of the disclosure, a computing apparatus includes: a memory storing one or more instructions; and a processor configured to execute the one or more instructions stored in the memory to: receive a template representing a composition of a mosaic image to be generated, segment an empty image into a plurality of sub areas, generate a plurality of source images respectively corresponding to the plurality of sub areas using an image generation neural network, the image generation neural network using, as a condition, information about the template, and generate a mosaic image by combining the plurality of source images respectively corresponding to the plurality of sub areas.

According to an example embodiment of the disclosure, the processor may be further configured to execute the one or more instructions to: obtain an esthetics score of a previously generated source image by evaluating esthetics of the previously generated source image based on generating the plurality of source images, and generate the plurality of source images respectively corresponding to the plurality of sub areas using the image generation neural network using, as a condition, the esthetics score of the previously generated source image.

According to an example embodiment of the disclosure, the information about the template may include object information corresponding to each of the plurality of sub areas in the template.

A method of operating a computing apparatus, according to an example embodiment of the disclosure, includes:

obtaining a plurality of sub area images by segmenting an input image into a plurality of sub areas; extracting a feature from each of the plurality of sub area images; generating a plurality of source images respectively corresponding to the plurality of sub areas using an image generation neural network, the image generation neural network using, as a condition, the feature extracted from each of the plurality of sub area images; and generating a mosaic image by combining the plurality of source images respectively corresponding to the plurality of sub areas.

A method of operating a computing apparatus, according to an embodiment of the disclosure, includes: segmenting an empty image into a plurality of sub areas; generating a plurality of source images respectively corresponding to the plurality of sub areas using an image generation neural network; and generating a mosaic image by combining the plurality of source images respectively corresponding to the plurality of sub areas, wherein the generating the plurality of source images comprises: obtaining an esthetics score of a previously generated source image by evaluating esthetics of the previously generated source image, and generating the plurality of source images respectively corresponding to the plurality of sub areas using the image generation neural network using, as a condition, the esthetics score of the previously generated source image.

A method of operating a computing apparatus, according to an embodiment of the disclosure, includes: receiving a template representing a composition of a mosaic image to be generated; segmenting an empty image into a plurality of sub areas; generating a plurality of source images respectively corresponding to the plurality of sub areas using an image generation neural network using, as a condition, information about the template; and generating a mosaic image by combining the plurality of source images respectively corresponding to the plurality of sub areas.

In a non-transitory computer-readable recording medium storing a program for executing an operation of a computing apparatus according to an embodiment of the disclosure, the operation includes: obtaining a plurality of sub area images by segmenting an input image into a plurality of sub areas; extracting a feature from each of the plurality of sub area images; generating a plurality of source images respectively corresponding to the plurality of sub area using an image generation neural network using, as a condition, the feature extracted from each of the plurality of sub area images; and generating a mosaic image by combining the plurality of source images respectively corresponding to the plurality of sub areas.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
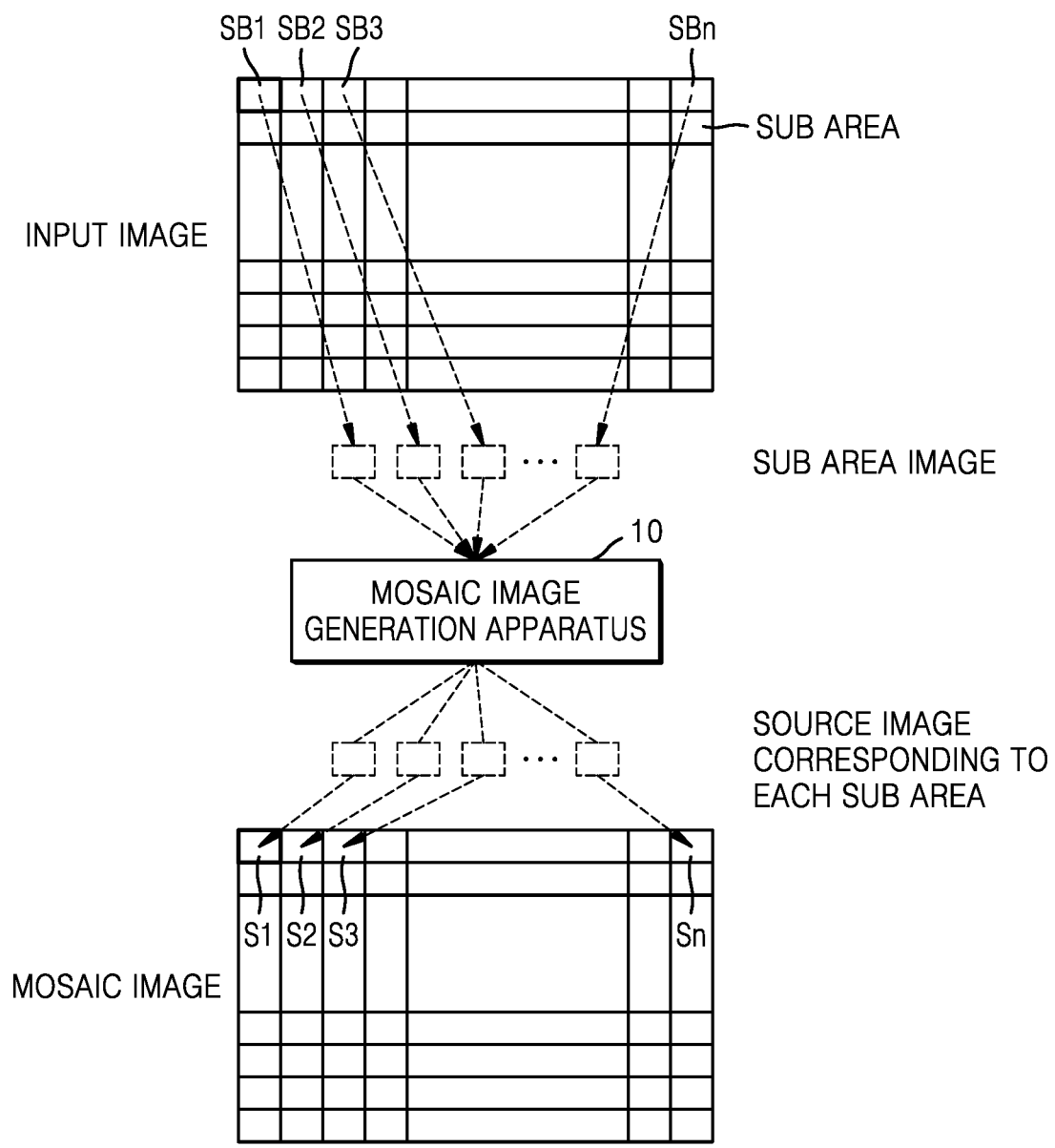
FIG. 1 is a diagram illustrating an example method of generating a mosaic image, according to an embodiment of the disclosure.

Terms used in this disclosure will be briefly described, and the disclosure will be described in greater detail below.

Although general terms being widely used in the present disclosure were selected as terminology used in the disclosure while considering the functions of the disclosure, they may vary according to intentions of one of ordinary skill in the art, judicial precedents, the advent of new technologies, and the like. Terms may be arbitrarily selected may also be used in a specific case. In this case, their meanings will be understood from the detailed description of the disclosure. Hence, the terms must be defined based on the meanings of the terms and the contents of the entire disclosure, not by simply stating the terms themselves.

It will be understood that when a certain part "includes" a certain component, the part does not exclude another component but can further include another component, unless the context clearly dictates otherwise. As used herein, the terms "portion", "module", or the like refers to a unit that can perform at least one function or operation, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

Hereinafter, the embodiments of the disclosure will be described in greater detail with reference to the accompanying drawings. However, the disclosure can be implemented in various different forms, and is not limited to the embodiments of the disclosure described herein. Also, in the drawings, portions irrelevant to the description may not be shown to definitely describe the disclosure, and throughout the entire disclosure, similar components are assigned like reference numerals.

In the embodiments of the disclosure, the term "user" may refer, for example, to a person who controls the functions or operations of an image display apparatus using a controller, and may include, for example, a viewer, a manager, or an installation engineer.

FIG. 1 is a diagram illustrating an example method of generating a mosaic image, according to an embodiment of the disclosure.

Referring to FIG. 1, a mosaic image generation apparatus may receive an input image, and generate a mosaic image corresponding to the received input image. The mosaic image generation apparatus 10 may generate source images to be located on a mosaic image to correspond to individual sub areas of the input image using a neural network, without having to store the source images in advance or receive the source images from outside.

The mosaic image generation apparatus 10 may include various circuitry and/or executable program elements and segment the input image into a plurality of sub areas. The input image may also be referred to as a target image, a base image, or a destination image. When the mosaic image generation apparatus 10 segments the input image into the sub areas, the mosaic image generation apparatus may segment the input image into an arbitrary number (for example, 100×100, 800×1000, 10000×10000, etc.) of sub areas.

The mosaic image generation apparatus 10 may generate the source images to respectively correspond to images of the segmented sub areas. For example, referring to FIG. 1, the mosaic image generation apparatus may generate a source image S1 corresponding to a sub area SB1 of the input image, a source image S2 corresponding to a sub area SB2 of the input image, a source image S3 corresponding to a sub area SB3 of the input image, and a source image Sn corresponding to a sub area SBn of the input image. In this way, the mosaic image generation apparatus may generate all the source images corresponding to the respective sub areas of the input image, and locate the source images at positions of the corresponding sub areas, thereby generating a mosaic image.

The mosaic image generation apparatus may use one or more neural networks to generate the mosaic image. The neural network may refer, for example, to a statistical learning algorithm that implements machine learning by mimicking an animal's brain.

As such, because the mosaic image generation apparatus according to embodiments of the disclosure newly generates source images to be used to construct a mosaic image, instead of using existing images, the mosaic image generation apparatus may not need to prepare source images in advance. Also, using a neural network to generate the source images, the mosaic image generation apparatus may construct a more natural mosaic image.

According to an embodiment of the disclosure, when the mosaic image generation apparatus generates a source image, the mosaic image generation apparatus may extract a feature of each sub area image of the input image, and generate a source image using the extracted feature, thereby generating the source image that sufficiently reflects the feature of the input image.

According to an embodiment of the disclosure, even when an input image is an empty image containing no content, the mosaic image generation apparatus may generate a next source image using a result of evaluation on esthetics of a generated source image, thereby constructing a mosaic image with high esthetics.

According to an embodiment of the disclosure, the mosaic image generation apparatus may generate a source image by reflecting a template constructing a mosaic image, thereby constructing a mosaic image having a user's desired composition.

Figure 2:
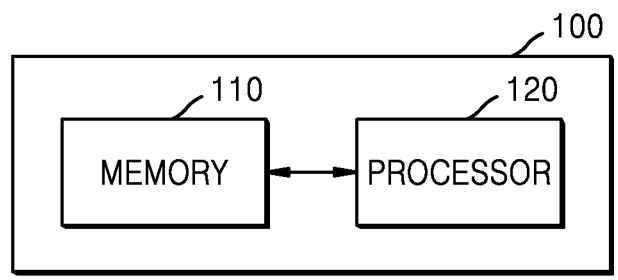
FIG. 2 is a block diagram illustrating an example computing apparatus according to an embodiment of the disclosure.

FIG. 2 is a block diagram illustrating an example computing apparatus 100 according to an embodiment of the disclosure.

Referring to FIG. 2, the computing apparatus 100 may include a memory 110 and a processor (e.g., including processing circuitry) 120. However, the computing apparatus 100 may be implemented by more components than those shown in FIG. 2, and is not limited to the example shown in FIG. 2.

The memory 110 according to an embodiment of the disclosure may store a program for processing and control of the processor 120, and data input to the computing apparatus 100 or to be output from the computing apparatus 100.

The memory 110 may include at least one kind of storage medium, among a flash memory type, a hard disk type, a multimedia card micro type, card type memory (for example, Secure Digital (SD) memory or eXtreme Digital (XD) memory), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 120 may include various processing circuitry and control overall operations of the computing apparatus 100. For example, the processor 120 may execute one or more instructions stored in the memory 110 to perform a function of the computing apparatus 100 proposed in the disclosure.

According to an embodiment of the disclosure, the processor 120 may execute one or more instructions stored in the memory 110 to perform the above-described operations. In this case, the memory 110 may store one or more instructions that are executable by the processor 120.

Also, according to an embodiment of the disclosure, the processor 120 may store one or more instructions in its internal memory, and execute the one or more instructions stored in the internal memory to perform the above-described operations. That is, the processor 120 may execute at least one instruction or program stored in the memory 110 or an internal memory included in the processor 120 to perform a predefined operation.

Also, in FIG. 2, a single processor 120 is shown, however, a plurality of processors (not shown) may be provided. In this case, each of operations that are performed in the computing apparatus 100 according to an embodiment of the disclosure may be performed through at least one of the plurality of processors.

According to an embodiment of the disclosure, the computing apparatus 100 may further include a neural network processor. The neural network processor may perform a control operation of performing an arithmetic operation through a neural network to execute a predefined operation. For example, according to an embodiment of the disclosure, the neural network processor may execute one or more instructions to perform an arithmetic operation through a neural network.

According to an embodiment of the disclosure, the processor 120 may execute one or more instructions stored in the memory 110 to segment an input image into a plurality of sub areas to obtain a plurality of sub area images, extract a feature from each sub area image, generate a source image corresponding to each sub area using an image generation neural network using, as a condition, the feature extracted from the sub area image, and combine a plurality of source images respectively corresponding to the plurality of sub areas to generate a mosaic image.

According to an embodiment of the disclosure, the processor 120 may execute one or more instructions stored in the memory 110 to extract the feature of the sub area image from the sub area image using a feature extraction neural network.

According to an embodiment of the disclosure, the feature of the sub area image may include at least one of a color, texture, or geometric information.

According to an embodiment of the disclosure, the image generation neural network may include a generative adversarial network (GAN).

According to an embodiment of the disclosure, the processor 120 may execute one or more instructions stored in the memory 110 to segment an empty image into a plurality of sub areas, generate a source image corresponding to each sub area using the image generation neural network, combine a plurality of source images respectively corresponding to the plurality of sub areas to generate a mosaic image, evaluate esthetics of a previously generated source image, when generating each source image, to obtain an esthetics score of the previously generated source image, and construct the source image corresponding to the source area using the image generation neural network using, as a condition, the esthetics score of the previously generated source image.

According to an embodiment of the disclosure, the processor 120 may execute one or more instructions stored in the memory 110 to evaluate, when obtaining the esthetics score of the previously generated source image, esthetics of the previously generated source image based on the previously generated source image and a partially complete mosaic image.

According to an embodiment of the disclosure, the processor 120 may execute one or more instructions stored in the memory 110 to receive a template representing a composition of a mosaic image to be generated, segment an empty image into a plurality of sub areas, generate a source image corresponding to each sub area using an image generation neural network using, as a condition, information about the template, and combine a plurality of source images respectively corresponding to the plurality of sub areas to generate a mosaic image.

According to an embodiment of the disclosure, the processor 120 may execute one or more instructions stored in the memory 110 to evaluate, when generating each source image, esthetics of a previously generated source image to obtain an esthetics score of the previously generated source image, and generate a source image corresponding to each sub area using the image generation neural network using, as a condition, the esthetics score of the previously generated source image.

A function related to generating source images for constructing a mosaic image using artificial intelligence, according to the disclosure, may operate through the processor 120 and the memory 110. The processor 120 may be configured with a single processor or a plurality of processors. The single processor or each of the plurality of processors include, for example, a general-purpose processor (for example, a central processing unit (CPU), an application processor (AP), and a digital signal processor (DSP)), a graphics-dedicated processor (for example, a graphics processing unit (GPU) and a vision processing unit (VPU)), or an artificial intelligence-dedicated processor (for example, a neural processing unit (NPU)). A single processor or the plurality of processors may perform a control operation of processing input data according to a predefined operation rule or artificial intelligence model stored in the memory 110. When a single processor or each of the plurality of processors is an artificial intelligence-dedicated processor, the artificial intelligence-dedicated processor may be designed as a specialized hardware structure for processing a predefined artificial intelligence model.

The predefined operation rule or artificial intelligence model may be created through training. Creating the predefined operation rule or artificial intelligence model through training means creating a predefined operation rule or artificial intelligent model set to perform a desired characteristic (or a purpose) when a basic artificial intelligence model is trained with a plurality of pieces of training data by a learning algorithm. The training may be performed by an apparatus of performing artificial intelligence according to the disclosure or by a separate server and/or system. The learning algorithm may be supervised learning, unsupervised learning, semi-supervised learning, or reinforcement learning, although not limited to the above-mentioned examples.

The artificial intelligence model may be configured with a plurality of neural network layers. Each of the plurality of neural network layers may have a plurality of weights, and perform a neural network arithmetic operation through an arithmetic operation between an arithmetic operation result of a previous layer and the plurality of weights. The plurality of weights of the plurality of neural network layers may be optimized by a training result of the artificial intelligence model. For example, the plurality of weights may be updated such that a loss value or a cost value obtained by the artificial intelligence model during a training process is reduced or minimized. An artificial neural network may include a deep neural network (DNN), and the artificial neural network may be, for example, a convolutional neural network (CNN), a deep neural network (DNN), a recurrent neural network (RNN), a restricted boltzmann machine (RBM), a deep belief network (DBN), a bidirectional recurrent deep neural network (BRDNN), or Deep Q-Networks, although not limited to the above-mentioned examples.

According to an embodiment of the disclosure, the computing apparatus 100 may generate a mosaic image using one or more neural networks, and transmit the mosaic image to an external display apparatus connected to the computing apparatus 100 through an output port for outputting video/audio signals or wireless communication to display the mosaic image. For example, the computing apparatus 100 may mainly perform data processing and include an apparatus such as a set-top box that transmits the processed data to an external display apparatus to display the processed data.

Figure 3:
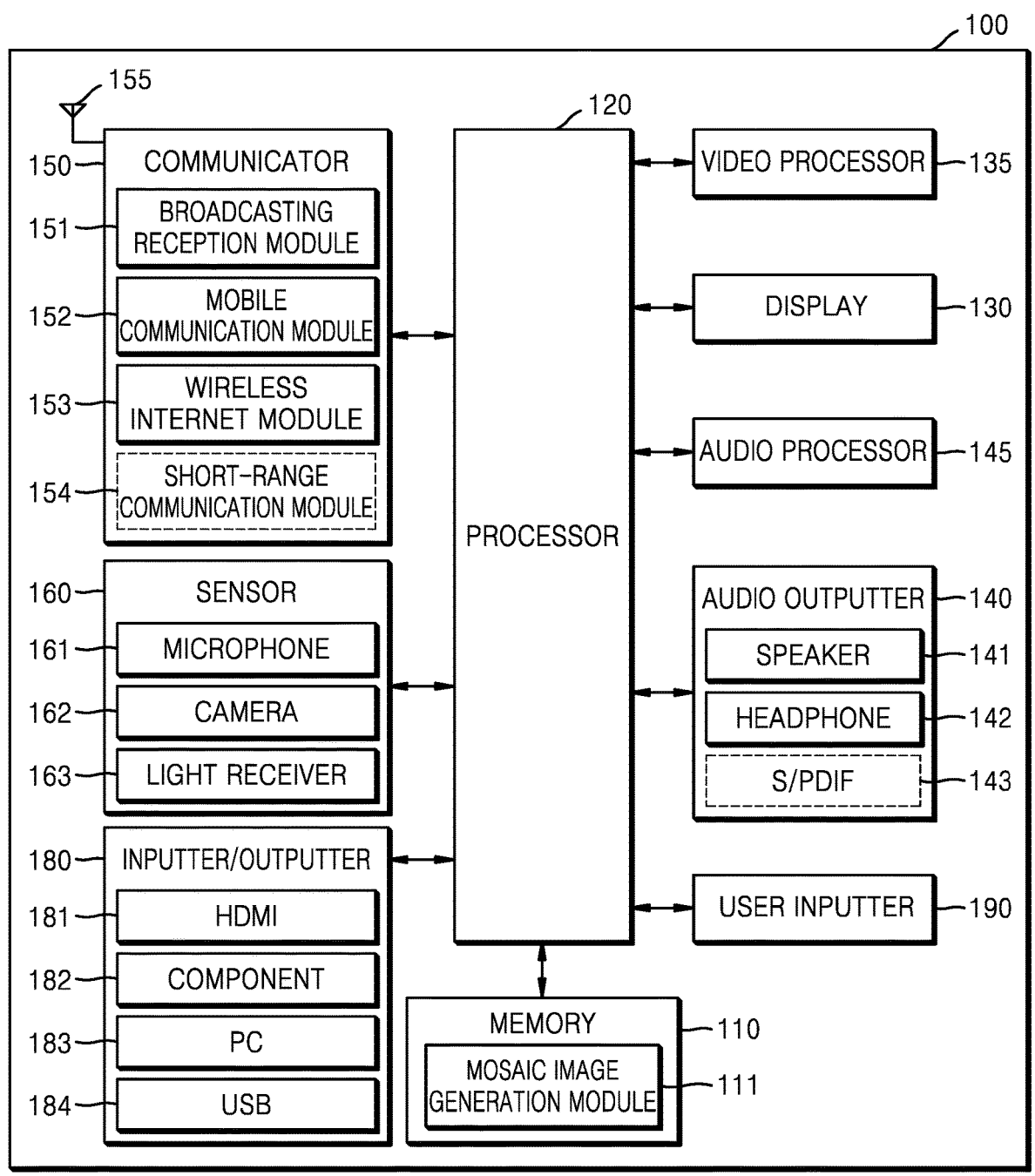
FIG. 3 is a block diagram illustrating an example computing apparatus according to an embodiment of the disclosure.

FIG. 3 is a block diagram illustrating an example of the computing apparatus 100 according to an embodiment of the disclosure.

In FIG. 3, the same components as those shown in FIG. 2 are assigned like reference numerals. Accordingly, in the following description about the computing apparatus 100, descriptions overlapping with those given above with reference to FIG. 2 will not be repeated here.

Referring to FIG. 3, the computing apparatus 100 may further include a display 130, a transmitting/receiving antenna 155, a communicator (e.g., including communication circuitry) 150, a sensor 160, an inputter/outputter (e.g., including input/output circuitry) 180, a video processor (e.g., including video processing circuitry) 135, an audio processor (e.g., including audio processing circuitry) 145, an audio outputter (e.g., including audio output circuitry) 140, and a user inputter (e.g., including input circuitry) 190, in addition to the memory 110 and the processor 120.

In the following description given with reference to FIG. 3, the same descriptions as those given above with reference to FIG. 2 in regard to the memory 110 and the processor 120 will be omitted.

The display 130 may display an image on a screen by a control of the processor 120. The image that is displayed on the screen may have been received from the communicator 150, the inputter/outputter 180, or the memory 110.

According to an embodiment of the disclosure, the display 130 may display a mosaic image constructed by the processor 120.

The transmitting/receiving antenna 155 may function to receive signals transmitted from other devices or transmit signals to the other devices. The transmitting/receiving antenna 155 is shown to be a single antenna, however, a plurality of antennas may be provided. Accordingly, the computing apparatus 100 according to the disclosure may support a multiple input multiple output (MIMO) system.

The communicator 150 may include various communication circuitry included in one or more modules to enable wireless communication between the computing apparatus 100 and a wireless communication system or between the computing apparatus 100 and a network on which another electronic apparatus is located. For example, the communicator 150 may include a broadcasting reception module 151, a mobile communication module 152, a wireless internet module 153, and a short-range communication module 154. The communicator 150 may also be referred to as a transceiver.

The broadcasting reception module 151 may include various circuitry and receive a broadcasting signal and/or broadcasting-related information from an external broadcasting management server through a broadcasting channel. The broadcasting signal may include a TV broadcasting signal, a radio broadcasting signal, and a data broadcasting signal, and may also include a broadcasting signal in which a data broadcasting signal is combined with a TV broadcasting signal or a radio broadcasting signal.

The mobile communication module 152 may include various circuitry and transmit/receive a wireless signal to/from at least one of a base station, an external terminal or a server on a mobile communication network. The wireless signal may include various formats of data according to transmission/reception of a voice call signal, a video call signal or a text/multimedia message.

The wireless internet module 153 may include various circuitry and be a module for wireless internet connections, and installed inside or outside the computing apparatus 100. As wireless internet technology, wireless LAN (WLAN), Wireless-Fidelity (Wi-Fi), World Interoperability for Microwave Access (Wimax), High Speed Downlink Packet Access (HSDPA), etc. may be used. Through the wireless internet module 153, the computing apparatus 100 may establish a Wi-Fi Peer to Peer (P2P) connection to another device. Through the Wi-Fi P2P connection, a device-to-device streaming service may be provided, and also, a data transmission/reception service or a printing service when the computing apparatus 100 is connected to a printer may be provided.

The short-range communication module 154 may include various circuitry and be a module for short-range communication. As short-range communication technology, Bluetooth, Radio Frequency Identification (RFID), Infrared Data Association (IrDA), Ultra Wideband (UWB), Zigbee, etc. may be used.

The communicator 150 according to an embodiment of the disclosure may receive a learning model using one or more neural networks from an external server.

The sensor 160 may sense a user's voice, a user's image or a user's interaction, and may include a microphone 161, a camera 162, and a light receiver 163.

The microphone 161 may receive a voice uttered by a user. The microphone 161 may convert the received voice into an electrical signal and output the electrical signal to the processor 120.

The camera 162 may receive an image (for example, successive frames) corresponding to a user's motion including a gesture made within a camera recognition range.

The light receiver 163 may receive an optical signal (including a control signal) transmitted from a remote controller. The light receiver 163 may receive an optical signal corresponding to a user's input (for example, a touch, pressing, a touch gesture, a speech, or a motion) from the remote controller. The control signal may be extracted from the received optical signal by a control of the processor 120.

According to an embodiment of the disclosure, a selection of a template of a mosaic image may be received through at least one of the microphone 161, the camera 162, or the optical receiver 163.

The inputter/outputter 180 may include various input/output circuitry and receive video (for example, a moving image), audio (for example, a voice, music, etc.), additional information (for example, electronic program guide (EPG), etc.), etc. from outside of the computing apparatus 100 by a control of the processor 120. The inputter/outputter 180 may include one of a high-definition multimedia interface (HDMI) port 181, a component jack 182, a PC port 183, and a universal serial bus (USB) port 184. The inputter/outputter 180 may include a combination of the HDMI port 181, the component jack 182, the PC port 183, and the USB port 184.

According to an embodiment of the disclosure, the memory 110 may store programs for processing and control of the processor 120, and data input to the computing apparatus 100 or to be output from the computing apparatus 100. Also, the memory 110 may store data required for operations of the computing apparatus 100.

Programs stored in the memory 110 may be classified into a plurality of modules according to their functions. For example, the memory 110 may store one or more programs for performing a predefined operation using a neural network. For example, the memory 110 may include a mosaic image generation module (e.g., including various executable program elements executed by the processor 120) 111 for performing mosaic image construction disclosed in the disclosure. For example, the mosaic image generation module 111 may include a mosaic image generation module 500 shown in FIG. 5, a mosaic image generation module 1200 shown in FIG. 12, a mosaic image generation module 1500 shown in FIG. 15, and/or a mosaic image generation module 1700 shown in FIG. 17.

The processor 120 may perform functions of controlling overall operations of the computing apparatus 100 and signal flows between internal components of the computing apparatus 100 and processing data. When a user's input is received or a preset, stored condition is satisfied, the processor 120 may execute an operation system (OS) or various applications stored in the memory 110.

The processor 120 may include an internal memory (not shown). In this case, at least one of data, a program, or an instruction stored in the memory 110 may be stored in the internal memory (not shown) of the processor 120. For example, the internal memory of the processor 120 may store at least one program for performing predefined operations using a neural network, or at least one instruction for performing predefined operations using a neural network.

According to an embodiment of the disclosure, the processor 120 may execute at least one instruction included in the mosaic image generation module stored in the memory 110 to perform a mosaic image generation operation of the computing apparatus 100 described in the disclosure.

The video processor 135 may include various video processing circuitry and process image data that is to be displayed on the display 130, and perform various image processing operations, such as decoding, rendering, scaling, noise filtering, frame-rate conversion, resolution conversion, etc., on the image data.

The audio processor 145 may include various audio processing circuitry and process audio data. The audio processor 145 may perform various processing, such as decoding, amplification, noise filtering, etc., on the audio data.

The audio outputter 140 may include various audio processing circuitry and output audio included in a broadcasting signal received through a tuner, audio input through the communicator 150 or the inputter/outputter 180, and audio stored in the memory 120, by the control of the processor 120. The audio outputter 140 may include at least one of a speaker 141, a headphone output terminal 142, or a Sony/Philips Digital Interface (S/PDIF) output terminal 143.

The user inputter 190 may include various input circuitry (e.g., user input circuitry) and enable a user to input data for controlling the computing apparatus 100. For example, the user inputter 190 may be a key pad, a dome switch, a touch pad, a jog wheel, a jog switch, etc., although not limited thereto.

The user inputter 190 according to an embodiment of the disclosure may receive a selection of a template of a mosaic image.

The block diagrams of the computing apparatus 100 shown in FIGS. 2 and 3 are block diagrams according to an embodiment of the disclosure. Some of the components of the block diagrams may be integrated or omitted, or other components may be added, according to an actual specification of the computing apparatus 100. For example, two or more of the components may be integrated into one component, or one component may be subdivided into two or more components, as necessary. Also, a function that is performed in each block is provided to describe embodiments of the disclosure, and detailed operations or devices therefor do not limit the scope of right of the disclosure.

Figure 4:
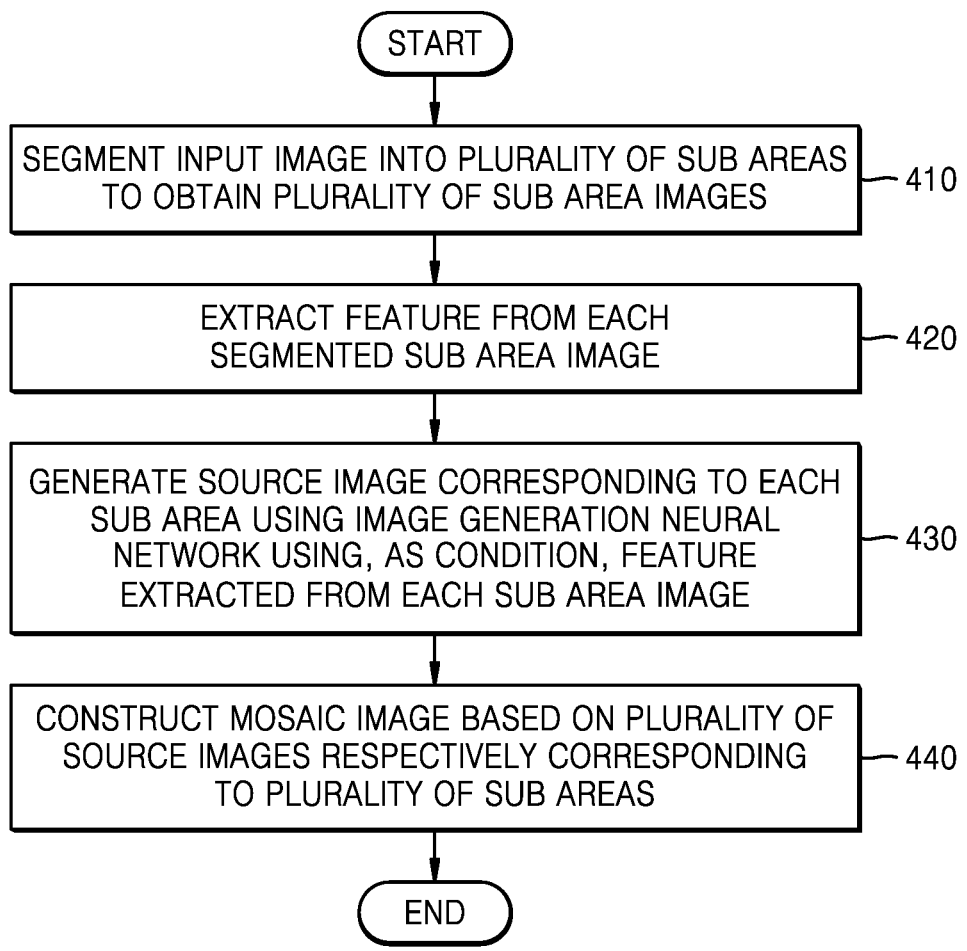
FIG. 4 is a flowchart illustrating an example method of operating a computing apparatus for constructing a mosaic image using an input image, according to an embodiment of the disclosure.

FIG. 4 is a flowchart illustrating an example method of operating the computing apparatus 100 of constructing a mosaic image using an input image, according to an embodiment of the disclosure.

Figure 5:
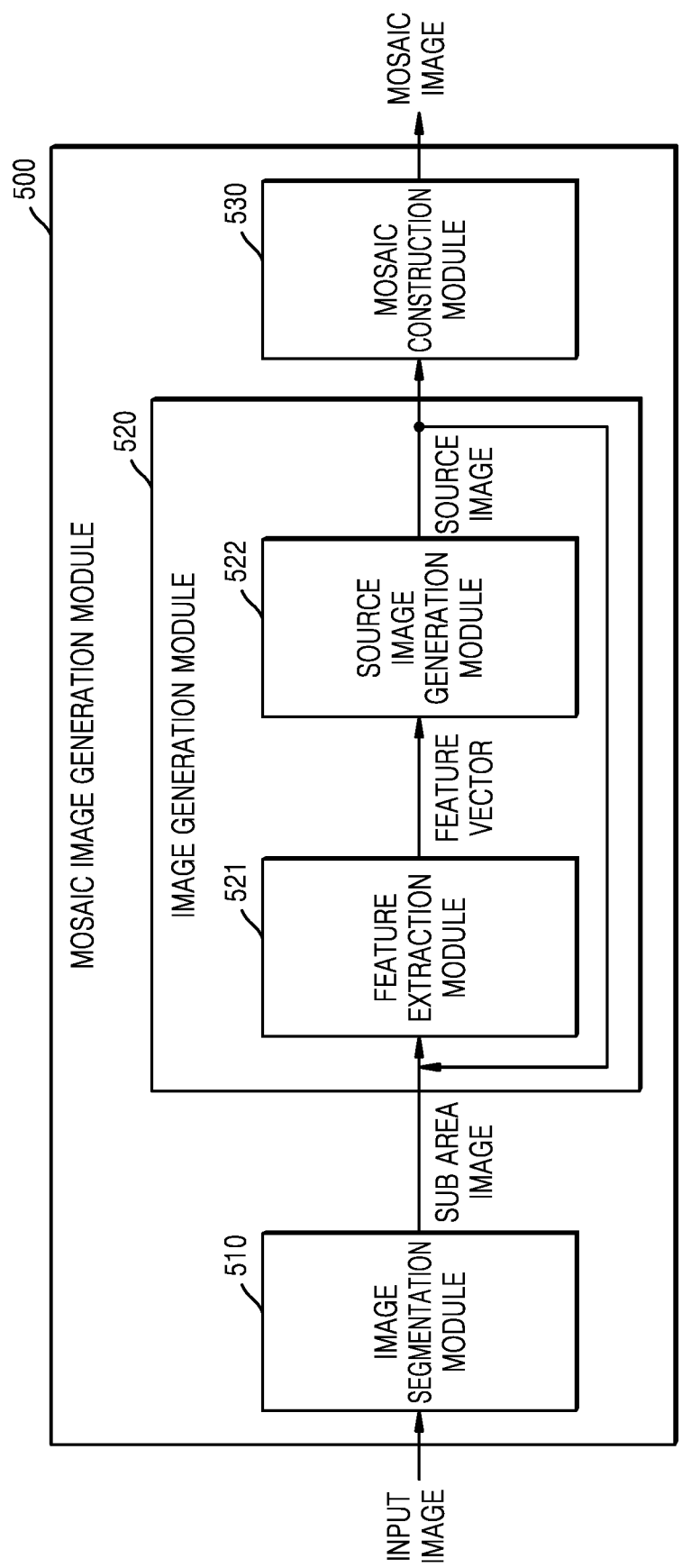
FIG. 5 is a block diagram illustrating an example mosaic image generation module for performing a function of a computing apparatus of constructing a mosaic image using an input image, according to an embodiment of the disclosure.

FIG. 5 is a block diagram illustrating an example mosaic image generation module 500 for performing a function of the computing apparatus 100 of constructing a mosaic image using an input image, according to an embodiment of the disclosure.

Figure 6:
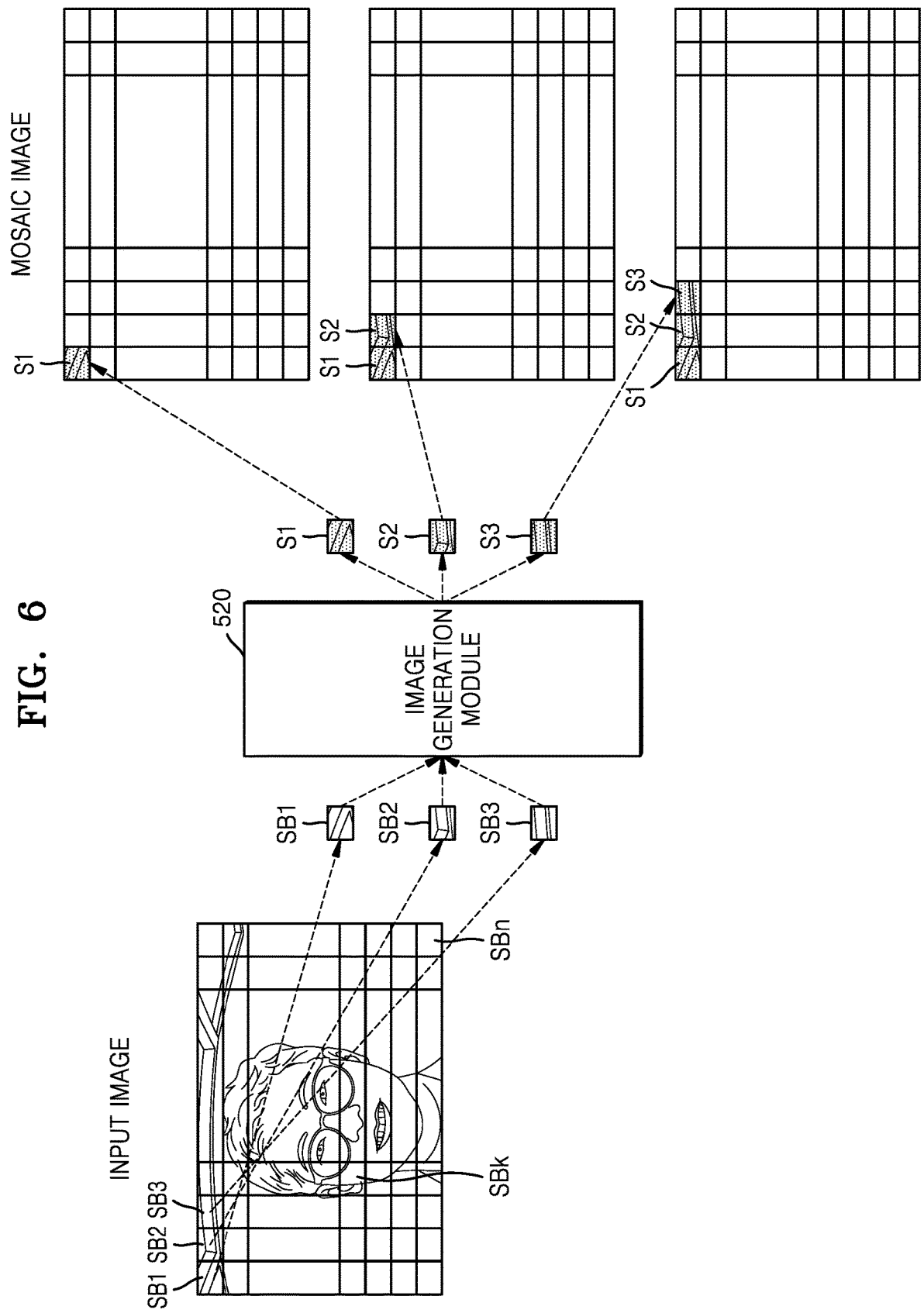
FIG. 6 is a diagram illustrating an example method of operating a computing apparatus for constructing a mosaic image using an input image, according to an embodiment of the disclosure.

FIG. 6 is a diagram illustrating an example method of the computing apparatus 100 of constructing a mosaic image using an input image, according to an embodiment of the disclosure.

Referring to FIGS. 4, 5 and 6, an operation method of constructing a mosaic image using an input image, according to an embodiment of the disclosure, will be described.

Referring to FIG. 4, the computing apparatus 100 may segment an input image into a plurality of sub areas to obtain a plurality of sub area images, in operation 410.

According to an embodiment of the disclosure, an image segmentation module 510 of the mosaic image generation module 500 shown in FIG. 5 may include an appropriate logic, circuit, interface, and/or code that is operable to receive an input image and segment the received input image into a plurality of sub areas to obtain a plurality of sub area images. The input image may be, for example, an image selected by a user.

The input image, which is a base for constructing a mosaic image, is also referred to as a base image, a target image, or a destination image. The mosaic image represents an image constructed by filling detail areas of the input image with small source images, while maintaining overall style, shape, or impression of the input image.

When the image segmentation module 510 segments the received input image into the plurality of sub areas, the image segmentation module 510 may segment the input image into an arbitrarily determined number of sub areas. The image segmentation module 510 may segment the received input image into sub areas that are grids having the same size. For example, the image segmentation module 510 may segment an input image into an arbitrary number (for example, 100×100 or 800×1000) of sub areas. A source image may be generated to correspond to each segmented sub area and filled at a position of the corresponding sub area. Therefore, the greater number of segmented sub areas, that is, the smaller size of segmented sub areas, the more natural mosaic image as seen from a human's vision.

Referring to FIG. 6, an input image may be segmented into n sub areas, so that sub area images SB1, SB2, SB3, . . . , SBk, . . . , SBn may be obtained.

In operation 420, the computing apparatus 100 may extract a feature from each segmented sub area image.

In operation 430, the computing apparatus 100 may generate a source image corresponding to each sub area through a neural network using, as a condition, the feature extracted from each sub area image.

Operations 420 and 430 may be performed by an image generation module 520 of the mosaic image generation module 500 shown in FIG. 5.

The image generation module 520 may include an appropriate logic, circuit, interface, and/or code that is operable to receive each sub area image from the image segmentation module 510 and generate a source image corresponding to the received sub area image.

The image generation module 520 may perform a process of receiving sub area images one by one from the image segmentation module 510 and generating a source image corresponding to each sub area image. The image generation module 520 may perform the process on all the sub area images segmented from the input image to thereby generate all source images that will construct a mosaic image.

According to an embodiment of the disclosure, a feature extraction module 521 of the mosaic image generation module 500 may include an appropriate logic, circuit, interface, and/or code that is operable to receive each sub area image segmented from the input image by the image segmentation module 510 and extract a feature from the sub area image. For example, the feature extraction module 521 may receive the sub area images SB1, SB2, SB3, . . . , SBk, . . . , SBn segmented from the input image shown in FIG. 6, in numerical order, and extract a feature corresponding to each sub area image.

According to an embodiment of the disclosure, the feature extraction module 521 may use a neural network to extract a feature of each sub area image from the sub area image. The feature extraction module 521 may use the neural network to extract one or more features of each sub area image from the sub area image, and output a feature vector corresponding to the extracted features. The feature of the sub area image may include at least one of semantic information, color information, or texture information.

According to an embodiment of the disclosure, the feature extraction module 520 may use, as a feature extraction model of extracting a feature from a composed area image using one or more neural networks, convolutional layers, such as, for example, CNN, ImageNet, etc.

Figure 7:
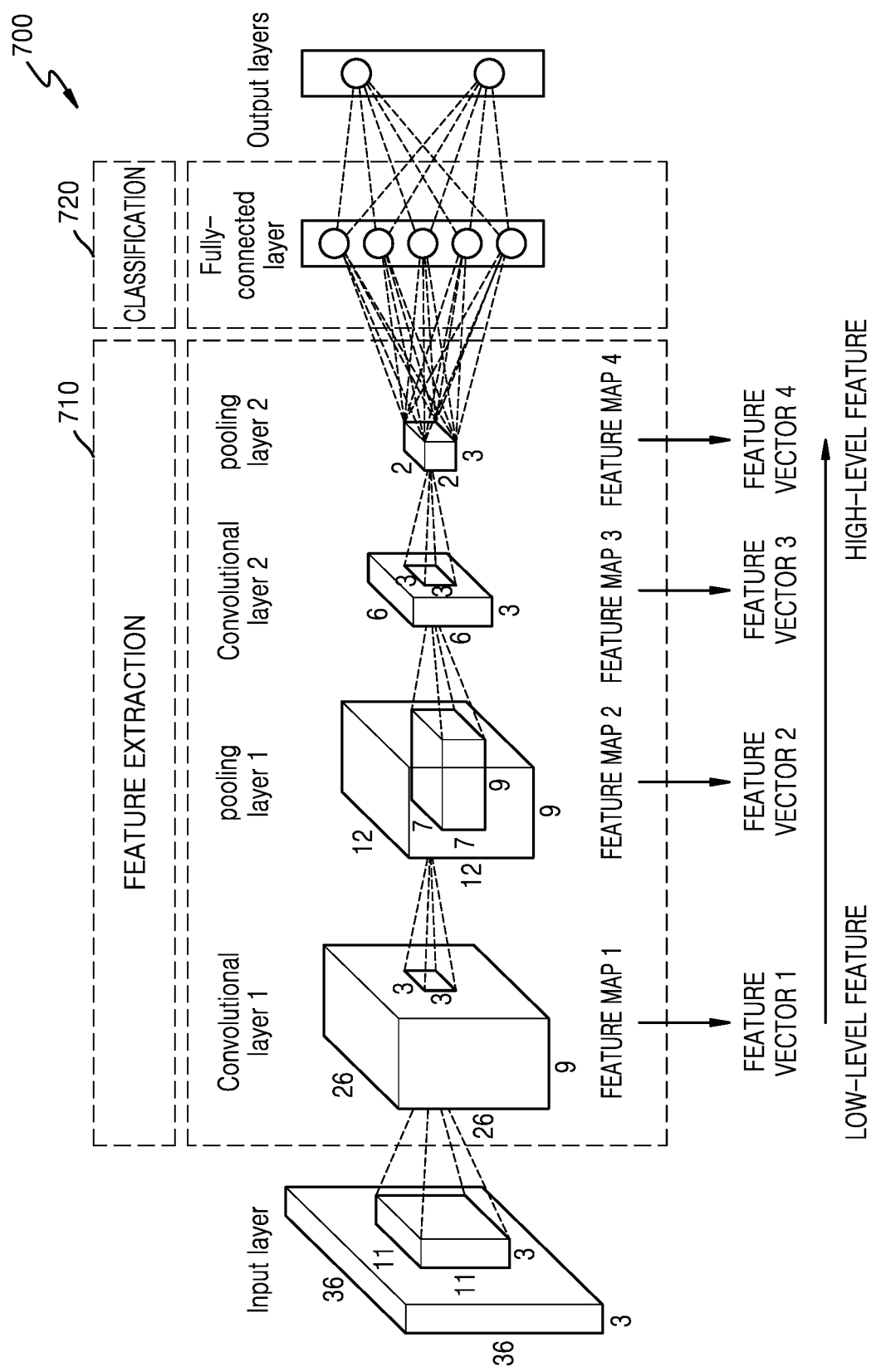
FIG. 7 is a diagram illustrating an example structure of a general convolutional neural network (CNN) according to an embodiment of the disclosure.

FIG. 7 is a diagram illustrating an example structure of a general CNN 700 according to an embodiment of the disclosure.

The CNN 700 may be configured with a convolutional feature extraction portion 710 and a classification portion 720. A feature of an input sub area image may be extracted through convolutional layers, and classification may be performed using an existing neural network based on the extracted feature.

The convolutional layers may function to extract a feature from input data, and may be configured with a filter of extracting a feature and an activation function of changing a value of the filter to a nonlinear value. The filter may include a function for determining whether or not a feature of an image, which is attempted to be extracted, exists in target data. When a feature map is extracted through the filter, the activation function may be applied to the feature map to activate a value. Representative activation functions may be a Sigmoid function and a Relu function.

The extracted feature map may be subject to sub-sampling as needed to reduce a size of the extracted feature map to reduce a computational quantity. The sub-sampling may also be referred to as pooling.

A fully connected layer is a process of applying, when a feature value is extracted in a convolutional layer, the feature value to an existing neural network to classify the feature value. As the fully connected layer, for example, a Softmax Function may be used.

The feature extraction module 520 may extract one or more feature maps (feature maps 1 to 4) generated in the CNN to use the extracted feature maps as a feature of a sub area image. The feature extraction module 520 may convert the feature maps (the feature maps 1 to 4) into vector forms, and output feature vectors 1 to 4. The feature extraction module 520 may output one or more of, for example, the feature vectors 1 to 4.

The feature extraction module 520 may extract various features from various scales of an image using convolutional layers and various filters.

Generally, at the shallower depth of the convolutional layers, low-level features of an image may be extracted, and at the deeper depth of the convolutional layers, high-level features of an image may be extracted. For example, in the case of a person's face, low-level features may include peripheral features, such as lines (for example, edge directions of the jaw) or colors (for example, skin colors), and high-level features may include combined features, such as eyes or noses. Accordingly, the feature extraction module 520 may appropriately extract a feature map corresponding to a high-level feature and a feature map corresponding to a lower-level feature and use the feature maps.

Also, the feature extraction module 520 may adjust a feature factor that is to be extracted from an image using a filter, etc. used in each convolutional layer. For example, the feature extraction module 720 may extract a color feature or a texture feature from an image using a filter that is used to extract color information from an image or a filter that is used to extract texture information from an image.

For example, features of an image may include a color, texture, a shape, etc., the color feature may include image colors, a color histogram representing distributions of colors in the image, color moments, color coherence vectors, etc., and the texture feature may include edges, etc.

In this way, the feature extraction module 521 may extract at least one of features of each sub area image and output the extracted feature. For example, in the input image shown in FIG. 6, white color information representing a background color may be extracted as a major feature from the sub area images SB1, SB2, and SB3, and red color information representing a lip color, color information representing a skin color, or edge information representing a contour of a face may be extracted as a major feature from the sub area image SBk.

The feature extraction module 521 may output at least one feature vector extracted from the sub area images to a source image generation module 522.

The source image generation module 522 may include an appropriate logic, circuit, interface, and/or code that is operable to generate a source image corresponding to the corresponding sub area using the at least one feature vector received from the feature extraction module 521. For example, the source image generation module 522 may receive feature vectors corresponding to the segmented sub area images SB1, SB2, SB3, . . . , SBk, . . . , SBn, and generate a source image corresponding to each sub area using a feature vector corresponding to the sub area image. The generated source image may contain a feature designated by the feature vector.

According to an embodiment of the disclosure, the source image generation module 522 may use a neural network, when generating the source image corresponding to the corresponding sub area using at least one feature vector.

According to an embodiment of the disclosure, an image generation model using a neural network, used by the source image generation module 522 to generate a source image using a feature vector, may include, for example, a conditional GAN.

A representative example of an image generation model may be a GAN. The GAN will be first described in greater detail below with reference to FIGS. 8 and 9 before the conditional GAN is described in greater detail below with reference to FIG. 10.

Figure 8:
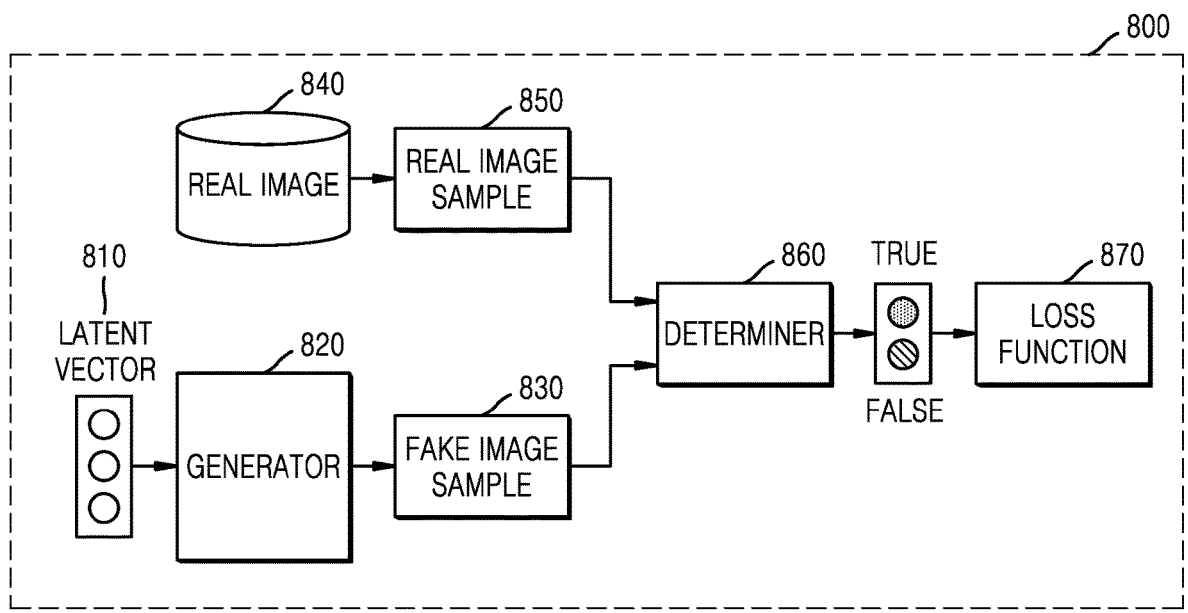
FIG. 8 is a diagram illustrating an example structure of a generative adversarial network (GAN) according to an embodiment of the disclosure.

FIG. 8 is a diagram illustrating an example structure of a GAN 800 according to an embodiment.

Referring to FIG. 8, the GAN 800 may include a generator 820 and a determiner 860.

The generator 820 may generate a new instance using random noise, and the determiner 860 may evaluate authenticity of data to determine whether or not each data instance is a real training data set, that is, whether an input image is a real image or a fake image. When a feature of a data instance is given, a label or category to which the corresponding data belongs may be estimated.

The generator 820 may include a function of receiving a random vector or a latent vector 'z' 810 as an input and outputting a fake image sample 830. Herein, 'z' may be a value randomly extracted from a uniform distribution or a normal distribution. The generator 820 may be considered as a function of mapping such a simple distribution to a complex distribution such as a human face image. It is known that, when a sufficient number of parameters exist in a generator model, the generator model may approximate to any complex distribution. A space where a 'z' vector exists is also called as a latent space. A size of a latent space may be arbitrarily determined. For example, a latent space may be set to 100 dimensions. However, the size of the latent space is not limited as long as the latent space is large enough to contain information about an object that is to be represented. The reason may be because the GAN maps a value of a 'z' vector to an attribute of an image.

The generator 820 may be aimed to generate fake data that is incapable of being distinguished from real data enough to cheat the determiner 860.

The determiner 860 may perform learning using real training data (real world images) and fake data generated by the generator 820 to determine whether a sample is real or fake. The determiner 860 may be a function of receiving an image as an input and outputting a probability that the image will be a real image as a number between 0 and 1.

As the determiner 860 continues to perform learning in a direction of making a correct determination and the generator 820 continues to perform learning in a direction of thoroughly cheating the determiner 860, the generator 820 may finally generate data that is little capable of being distinguished from real data, and the determiner 860 may also gradually improve ability of distinction such that a loss function 870 is minimized and/or reduced. The GAN may adversarially train the generator 820 and the determiner 860 to make a distinction between real and fake difficult.

Figure 9:
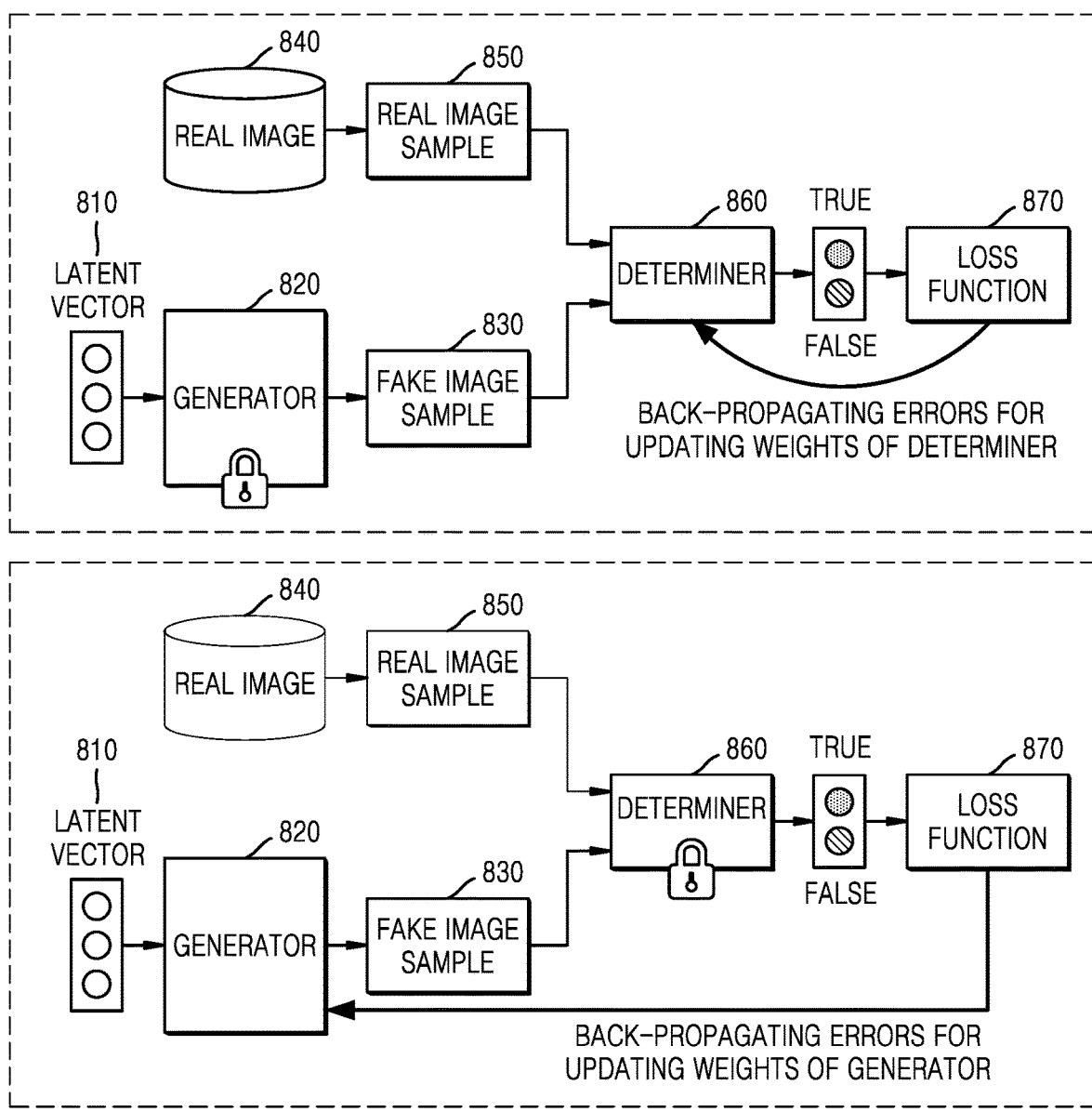
FIG. 9 is a diagram illustrating an example learning method of an image generation model according to an embodiment of the disclosure.

FIG. 9 is a diagram illustrating an example learning method of an image generation model according to an embodiment of the disclosure.

Training of the GAN may include two stages, and a first stage of the two stages may be to train the determiner 860 while fixing the generator 820. Because the determiner 860 already knows which one is real and which one is fake, the determiner 860 may define a cost function or a loss function and update weights while back-propagating errors, like a learning method of an existing determination network.

Referring to FIG. 8, when a real image sample 850 from a real image dataset 840 is input to the determiner 860, the determiner 860 may need to output a probability value that is close to 1, and when a fake image sample 830 is input, the determiner 860 may need to output a probability value that is close to 0. Accordingly, the loss function 870 of the determiner 860 may be configured with a sum of two values. A sum of a difference between 1 and an output value when a real image is input and a difference between 0 and an output value when a fake image is input may be the loss function 870 of the determiner 860. By updating parameters of the determiner 860 in a direction of minimizing a value of the loss function 870, the determiner 860 may perform learning.

A second stage of the two stages may be to train the generator 820 while fixing the determiner 860. Because the generator 820 is aimed to cheat the determiner 860, the generator 820 may be trained such that the determiner 860 mistakes fake for real. That is, the generator 820 may be aimed to cheat the determiner 860. In other words, when a fake image generated by the generator 820 is input to the determiner 860, the determiner 860 may need to output an output value that is close to 1. A difference between the output value and 1 may become a loss function of the generator 820, and the generator 820 may be trained to minimize the difference.

As the two stages are repeatedly performed, the determiner 860 and the generator 820 may repeat development to reach an equilibrium state.

Figure 10:
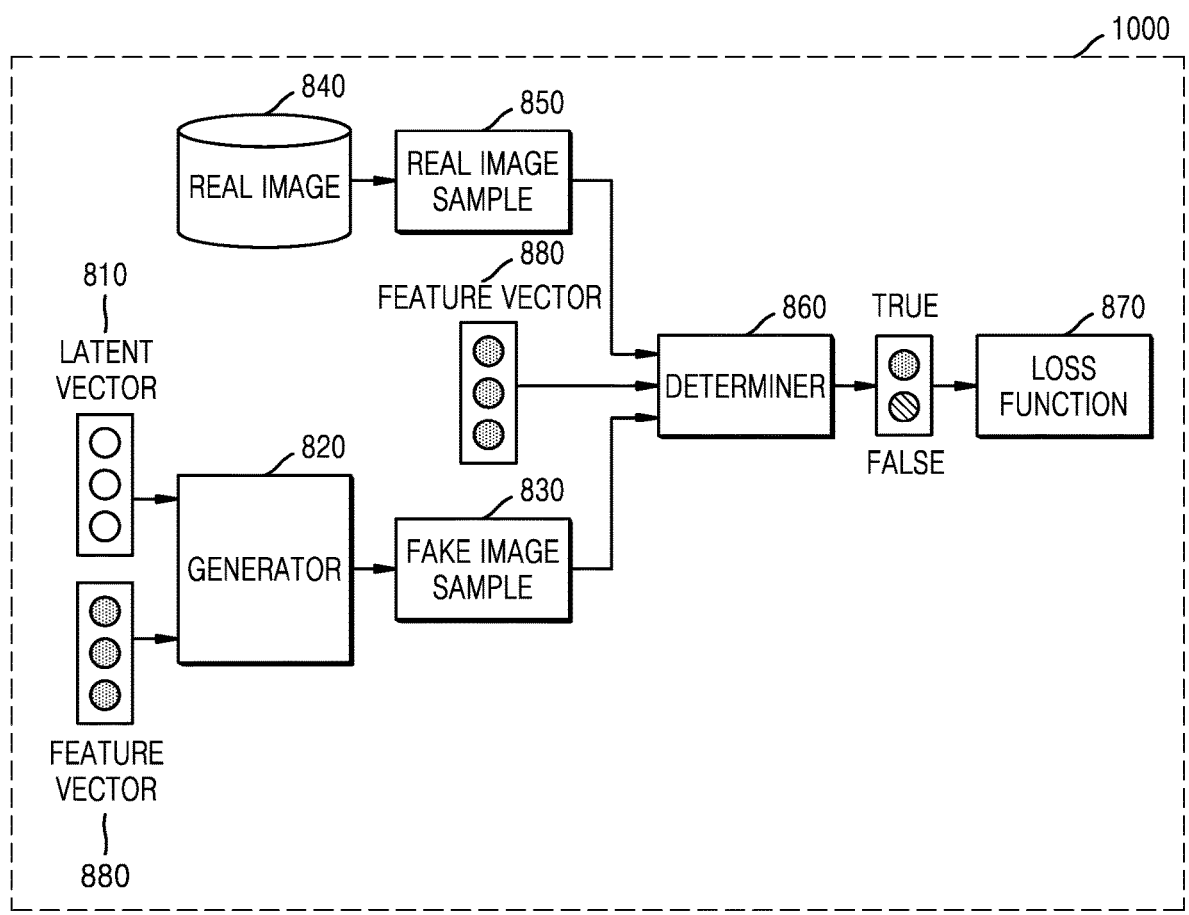
FIG. 10 is a diagram illustrating an example of a conditional GAN of generating an image by further using a feature vector, according to an embodiment of the disclosure.

FIG. 10 is a diagram illustrating an example of a conditional GAN 1000 of generating an image by further using a feature vector 880, according to an embodiment of the disclosure.

Referring to FIG. 10, the conditional GAN 1000 shown in FIG. 10 may be similar to the GAN 800 shown in FIG. 8, except that the feature vector 880 is further added as an input of the generator 820 and the determiner 860.

The conditional GAN 1000 may be trained by further adding the feature vector 880 as a condition y to the existing GAN.

The generator 820 may perform concatenation on the latent vector 810 and the feature vector 880 to generate a fake image sample 830, and likewise, the determiner 860 may perform concatenation on the fake image sample 830 and the feature vector 880 to use the concatenated result as an input of the determiner 860. However, a method for further combining the feature vector 880 is not necessarily limited to concatenation, and a simple sum or projection may be used.

In this way, by further using the feature vector 880 during the training, the conditional GAN 1000 may generate an image by further reflecting an image feature corresponding to the feature vector 880. For example, when the feature vector 880 extracted from the sub area image SBk relates to a feature corresponding to color information representing a red color, the conditional GAN 1000 may generate a source image by further using the color information representing the red color. When the feature vector 880 extracted from the sub area image SBk relates to a feature corresponding to edge information representing a contour of a face, the conditional GAN 1000 may generate an image by further using the edge information representing the contour of the face.

The source image generation module 522 may output a source image generated to correspond to each sub area image to a mosaic construction module 530 (see FIG. 5).

In operation 440, the computing apparatus 100 may construct a mosaic image based on a plurality of source images respectively corresponding to the plurality of sub areas.

The mosaic construction module 530 may include an appropriate logic, circuit, interface, and/or code that is operable to receive source images corresponding to the respective sub area images of the input image from the source image generation module 522 and locate the source images at the corresponding sub areas to construct a mosaic image.

For example, referring to FIG. 6, the mosaic construction module 530 may locate the source images generated to correspond to the sub area images up to an area corresponding to the sub area image SBn in a mosaic image area, in such a way to locate a source image S1 generated to correspond to the sub area image SB1 of the input image at an area corresponding to the sub area image SB1 in the mosaic image area, locate a source image S2 generated to correspond to the sub area image SB2 of the input image at an area corresponding to the sub area image SB2 in the mosaic image area, and locate a source image S3 generated to correspond to the sub area image SB3 of the input image at an area corresponding to the sub area image SB3 in the mosaic image area, thereby constructing a mosaic image.

As such, by segmenting the input image into the plurality of sub areas to generate the plurality of sub area images, extracting a feature of each sub area image, and generating a source image corresponding to the corresponding sub area based on the feature of the sub area image to construct a mosaic image, the mosaic image to which the feature of the input image is sufficiently reflected may be constructed without having to prepare source images in advance.

An embodiment of the disclosure of constructing a mosaic image using an input image including content has been described with reference to FIGS. 4, 5, 6, 7, 8, 9 and 10. According to some embodiments of the disclosure, a mosaic image may be constructed using an input image including no content, that is, an empty image.

Hereinafter, a method of constructing a mosaic image when there is an empty image, that is, when there is no input image will be described in greater detail below with reference to FIGS. 11, 12 and 13.

Figure 11:
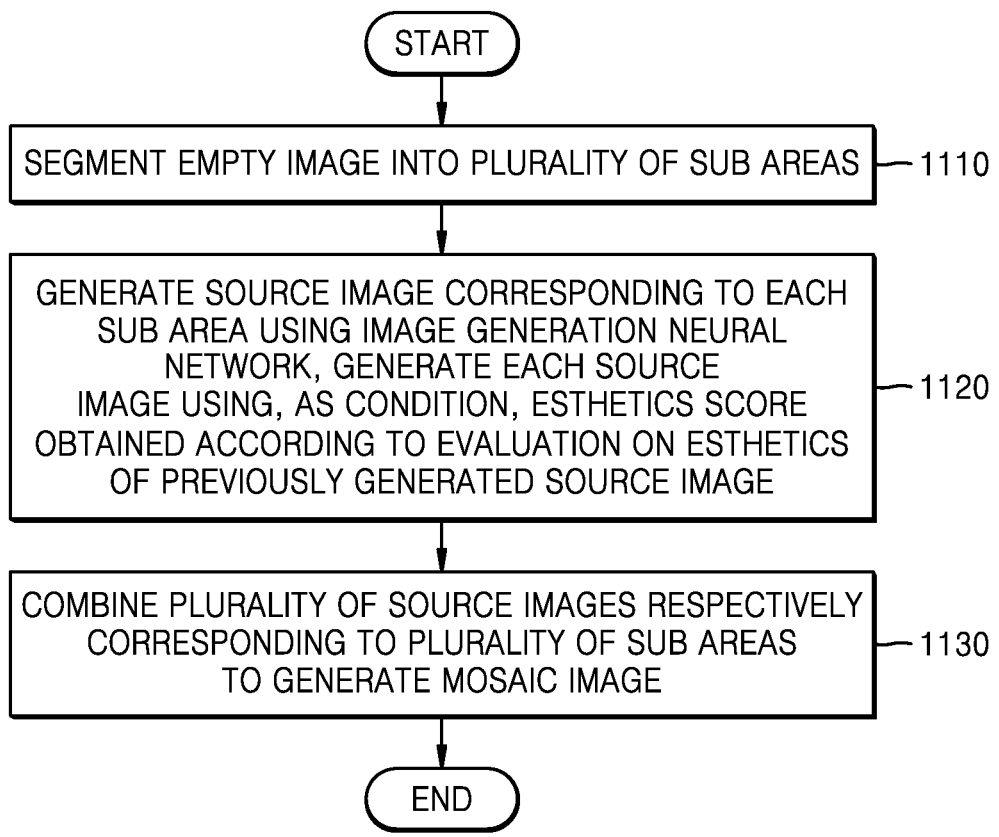
FIG. 11 is a flowchart illustrating an example process of constructing a mosaic image using an empty image, according to an embodiment of the disclosure.

FIG. 11 is a flowchart illustrating an example process of constructing a mosaic image using an empty image, according to an embodiment of the disclosure.

Figure 12:
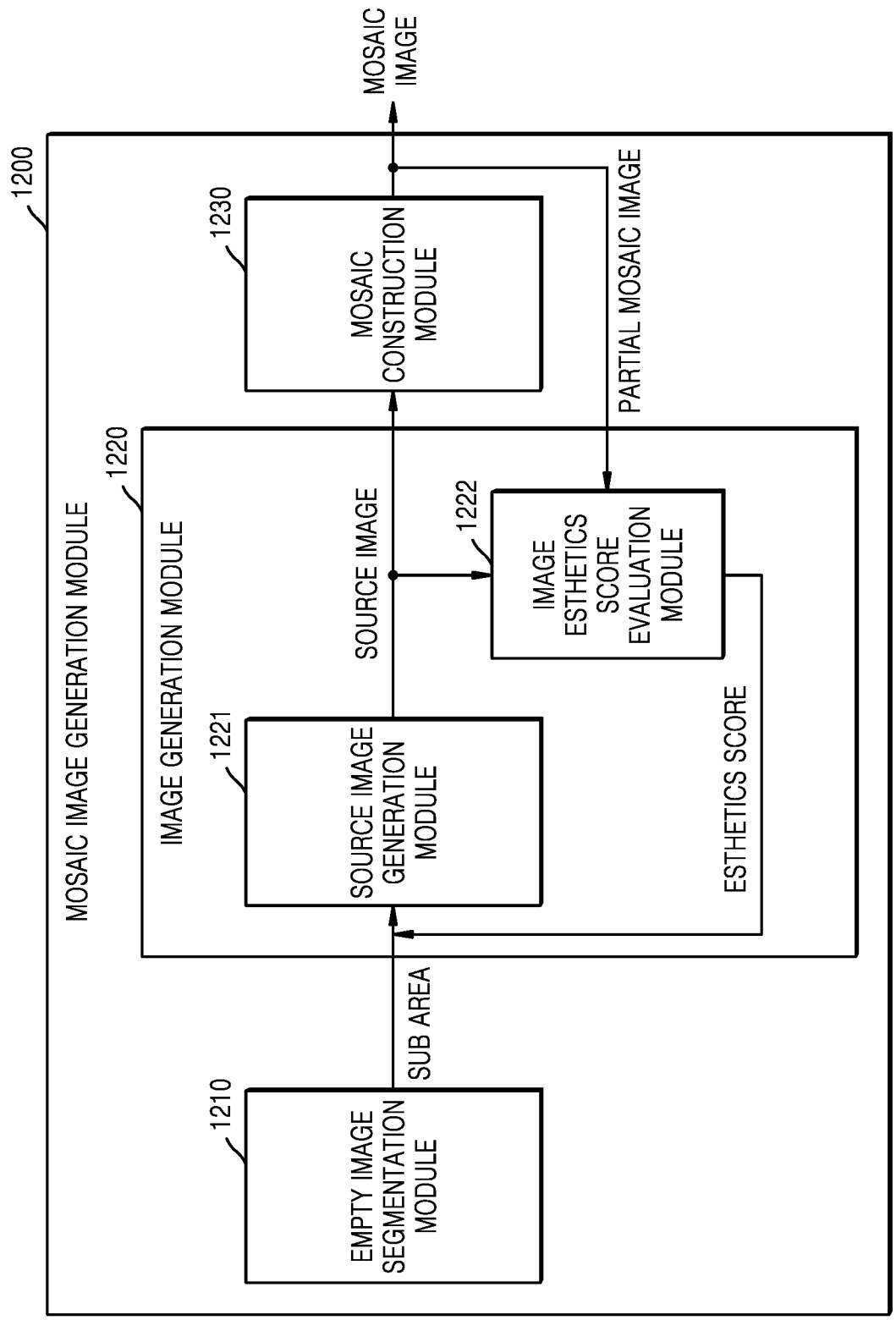
FIG. 12 is a block diagram illustrating an example mosaic image generation module constructing a mosaic image using an empty image, according to an embodiment of the disclosure.

FIG. 12 is a block diagram illustrating an example mosaic image generation module 1200 of constructing a mosaic image using an empty image, according to an embodiment of the disclosure.

Figure 13:
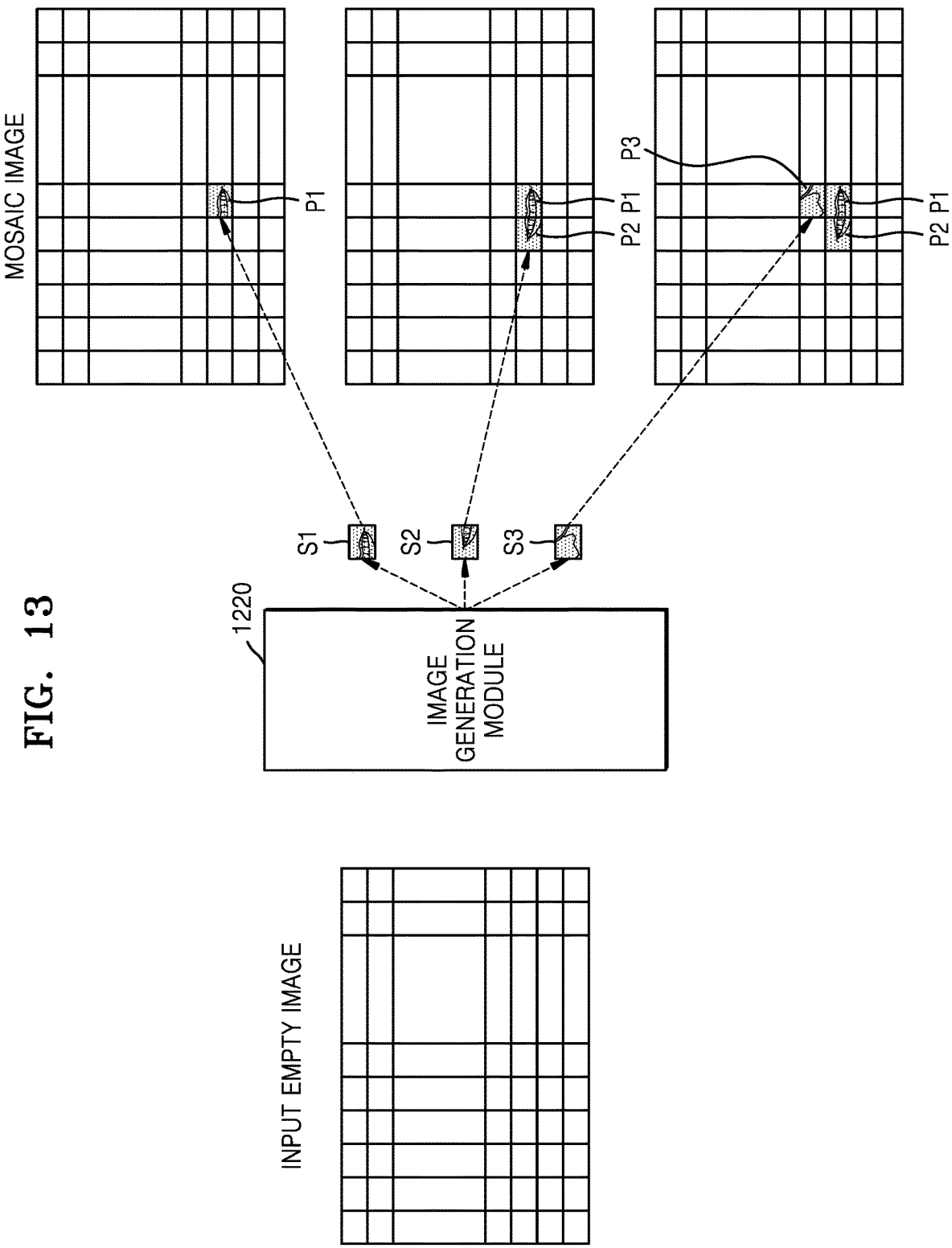
FIG. 13 is a diagram illustrating an example method of constructing a mosaic image using an empty image, according to an embodiment of the disclosure.

FIG. 13 is a diagram illustrating an example method of constructing a mosaic image using an empty image, according to an embodiment of the disclosure.

Referring to FIG. 11, in operation 1110, the computing apparatus 100 may segment an empty image into a plurality of sub areas.

In FIG. 12, an empty image segmentation module 1210 of the mosaic image generation module 1200 may determine a size of a source image to construct a mosaic image by segmenting an area of an empty image including no content.

In operation 1120, the computing apparatus 100 may generate a source image corresponding to each sub area using a neural network. The computing apparatus 100 may evaluate, when generating each source image, esthetics of a previously generated source image to obtain an esthetics score of the previously generated source image, and generate a source image corresponding to each sub area using an image generation neural network using, as a condition, the esthetics score of the previously generated source image.

In operation 1130, the computing apparatus 100 may combine a plurality of source images respectively corresponding to the plurality of sub areas to generate a mosaic image.

Operations 1120 and 1130 may be performed by a source image generation module 1221 and an image esthetics score evaluation module 1222 of an image generation module 1220 shown in FIG. 12.

The image generation module 1220 may generate a source image to construct a mosaic image and output the source image to a mosaic construction module 1230. Because the image generation module 1220 generates each source image using an esthetics score of a previously generated source image, the image generation module 1220 may generate a source image that is more esthetically natural than previously generated source images.

The source image generation module 1221 may generate a source image to construct a mosaic image. The source image generation module 1221 may include an appropriate logic, circuit, interface, and/or code that is operable to generate a source image using, as a condition, an esthetics score of a previous source image output from the image esthetics score evaluation module 1222. Using, as a condition, an esthetics score of the previous source image means inputting, as a condition, an esthetics score, instead of the feature vector in the conditional GAN 1000 shown in FIG. 10.

The image esthetics score evaluation module 1222 may include an appropriate logic, circuit, interface, and/or code that is operable to receive a source image from the source image generation module 1221 and evaluate esthetics of the received source image to obtain an esthetics score.

The image esthetics score evaluation module 1222 may use an esthetics evaluation neural network to evaluate esthetics of the received source image. The esthetics evaluation neural network may refer, for example, to a neural network trained to evaluate esthetics of a received image and output an esthetics score of the received image. During the training of the esthetics evaluation neural network, by performing learning using, as inputs, many sample images including, for example, a convolutional layer and a classification layer and label information in which esthetics scores are manually given to the corresponding sample images, an esthetics score of an image may be evaluated.

The image esthetics score evaluation module 1222 may receive a partial mosaic image constructed by the mosaic construction module 1230 and use the partial mosaic image to evaluate esthetics of a current source image.

Also, the image esthetics score evaluation module 1222 may output an esthetics score obtained for a source image to the source image generation module 1221.

The source image generation module 1221 may generate a source image using, as a condition, the esthetics score of the previous source image received from the image esthetics score evaluation module 1222.

Referring to FIG. 13, a method of constructing a mosaic image when there is no input image will be described.

Referring to FIG. 13, for example, the source image generation module 1221 may generate a first source image S1 for constructing a mosaic image without using any condition. The first source image S1 may be arbitrarily located at any sub area of the mosaic image. For example, it is assumed that the first source image S1 is located at a position P1 of sub areas of the mosaic image, as shown in FIG. 13.

The image esthetics score evaluation module 1222 may evaluate esthetics of the first source image S1 to obtain an esthetics score, and then output the esthetics score to the source image generation module 1221.

The source image generation module 1221 may generate a second source image S2 using, as a condition, the esthetics score of the first source image S1 received from the image esthetics score evaluation module 1222, and output the second source image S2 to the image esthetics score evaluation module 1222 and the mosaic construction module 1230. The mosaic construction module 1230 may locate the second source image S2 at a position P2 neighboring the first source image S1.

The image esthetics score evaluation module 1222 may receive the second source image S2 output from the source image generation module 1221 and a partial mosaic image (that is, the first source image S1) which is output from the mosaic construction module 1230 and in which a source image up to the previous source image is located, evaluate esthetics of an image based on the first and second source images S1 and S2 to obtain an esthetics score, and then output the esthetics score to the source image generation module 1221.

The source image generation module 1221 may generate a third source image S3 using, as a condition, the esthetics scores (that is, esthetics evaluation results based on the first and second source images S1 and S2) of the previous source images received from the image esthetics score evaluation module 1222, and output the third source image S3 to the image esthetics score evaluation module 1222 and the mosaic construction module 1230. The mosaic construction module 1230 may locate the third source image S3 at a position P3 neighboring the second source image S2.

The image esthetics score evaluation module 1222 may receive the third source image S3 output from the source image generation module 1221 and a partial mosaic image (that is, the first and second source images S1 and S2) which is output from the mosaic construction module 1230 and in which source images up to the previous source image are located, evaluate esthetics of an image based on the first, second and third source images S1, S2, and S3 to obtain an esthetics score, and then output the esthetics score to the source image generation module 1221.

By repeatedly performing the above-described operation by the number of source images that fill the mosaic image, the mosaic image generation module 1200 may generate source images and fill the source images in the mosaic image.

In this way, by generating, even when there is no input image, a next source image by reflecting an esthetics evaluation result of the previous source image to generate a source image with high esthetics, a natural mosaic image with high esthetics may be obtained.

According to various embodiments of the disclosure, a mosaic image may be constructed based on a user's template, even though an input image (that is, an empty image) including no content is used.

Hereinafter, a method of constructing a mosaic image based on a template will be described in greater with reference to FIGS. 14, 15, 16 and 17.

Figure 14:
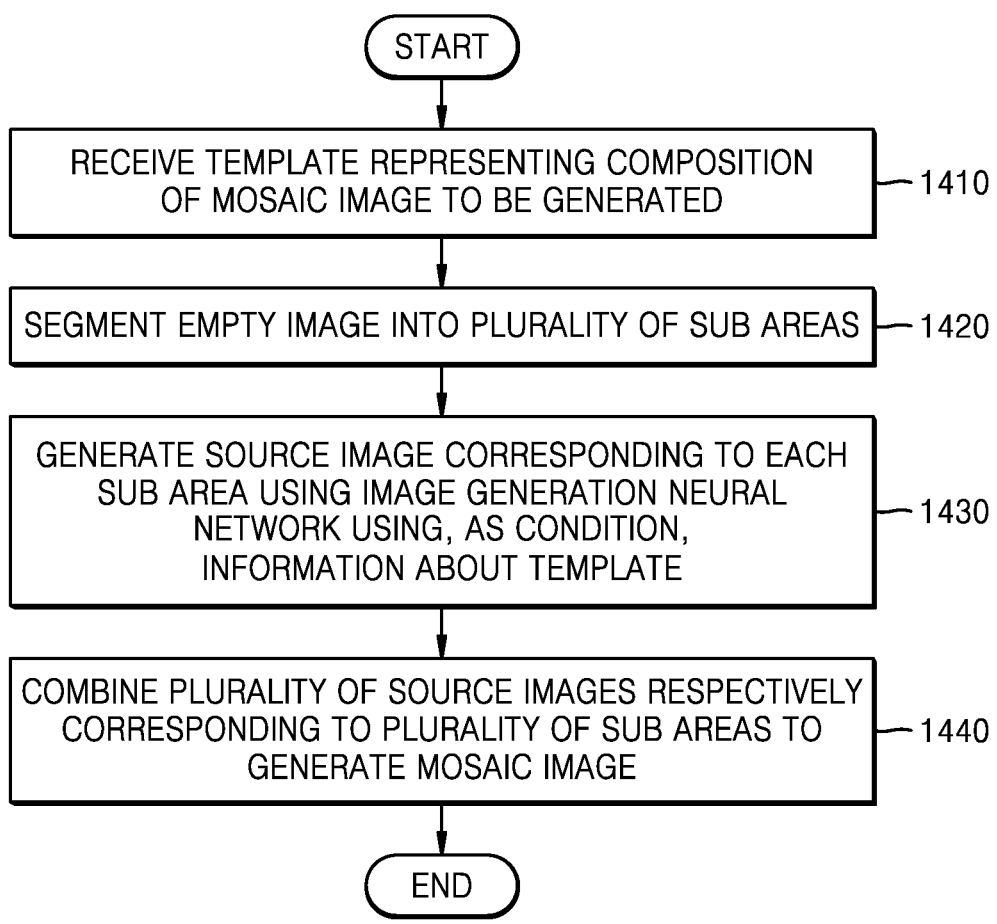
FIG. 14 is a flowchart illustrating an example process of constructing a mosaic image based on a template, according to an embodiment of the disclosure.

FIG. 14 is a flowchart illustrating an example process of constructing a mosaic image based on a template, according to an embodiment of the disclosure.

Figure 15:
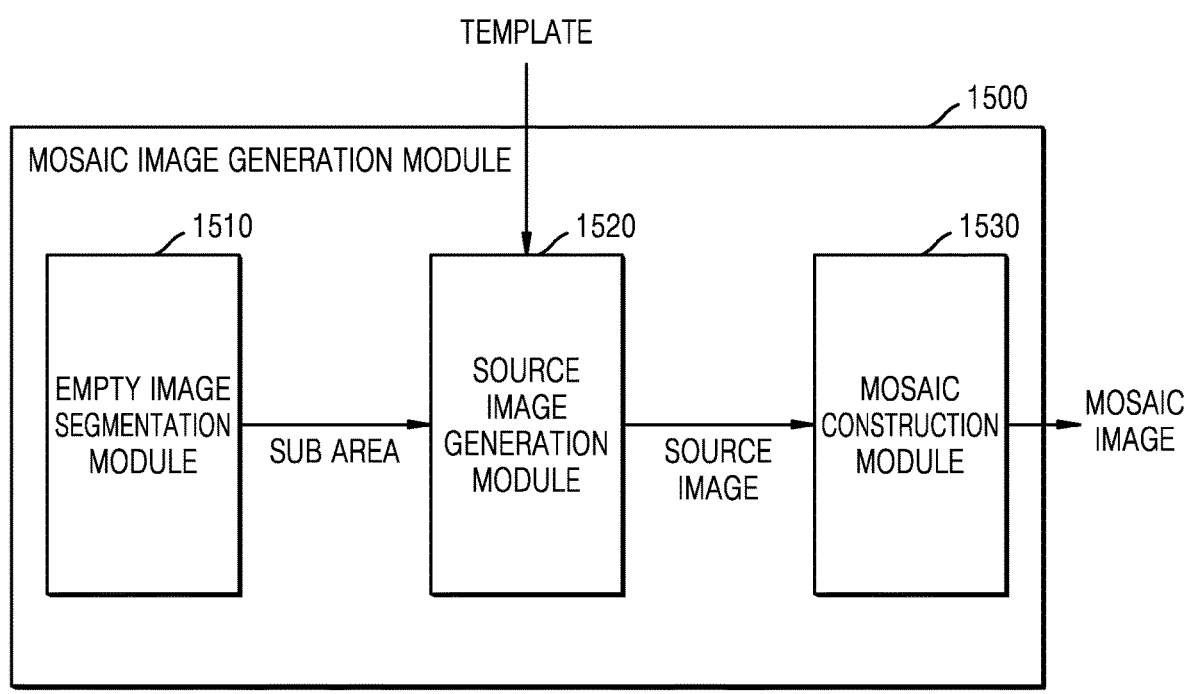
FIG. 15 is a block diagram illustrating an example mosaic image generation module constructing a mosaic image based on a template, according to an embodiment of the disclosure.

FIG. 15 is a block diagram functionally illustrating the mosaic image generation module 1500 of constructing a mosaic image based on a template, according to an embodiment of the disclosure.

Figure 16:
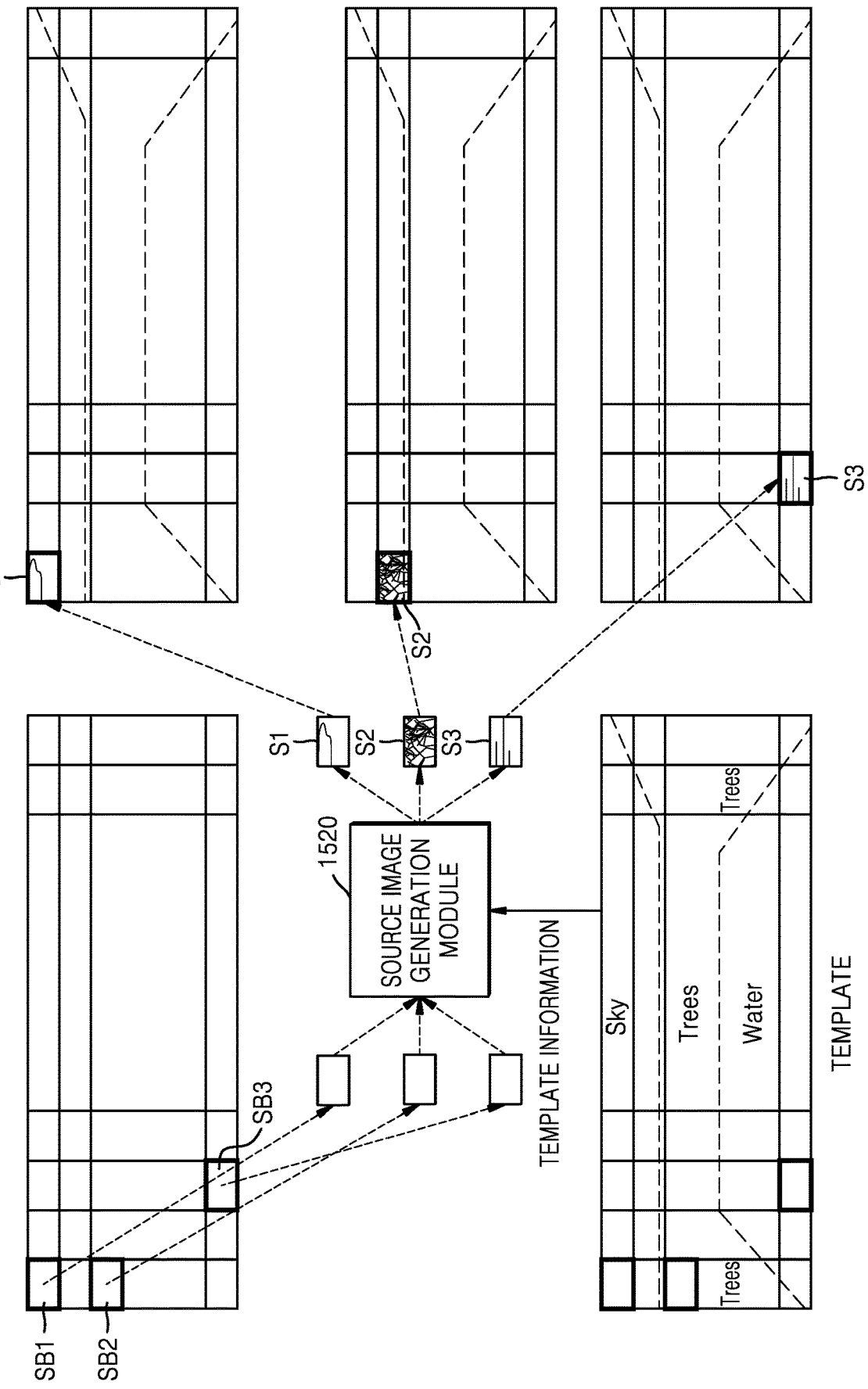
FIG. 16 is a diagram illustrating an example method of constructing a mosaic image based on a template, according to an embodiment of the disclosure.

FIG. 16 is a diagram illustrating an example method of constructing a mosaic image based on a template, according to an embodiment of the disclosure.

Referring to FIG. 14, in operation 1410, the computing apparatus 100 may receive a template representing a composition of a mosaic image to be generated.

In operation 1420, the computing apparatus 100 may segment an empty image into a plurality of sub areas.

Referring to FIG. 15, an empty image segmentation module 1510 of the mosaic image generation module 1500 may segment an area of the empty image including no content to determine a size of a source image to construct a mosaic image.

In operation 1430, the computing apparatus 100 may generate a source image corresponding to each sub area using an image generation neural network using, as a condition, information about the template.

In operation 1440, the computing apparatus 100 may combine a plurality of source images respectively corresponding to the plurality of sub areas to generate a mosaic image.

Operations 1430 and 1440 may be performed by a source image generation module 1520 and a mosaic construction module 1530 shown in FIG. 15.

The source image generation module 1520 may include an appropriate logic, circuit, interface, and/or code that is operable to generate a source image constructing a mosaic image using, as a condition, the information about the template. Using, as a condition, information about a template means inputting, as a condition, template information instead of the feature vector in the conditional GAN structure shown in FIG. 10.

The template may represent a composition, etc. of the mosaic image to be constructed. For example, the template may segment a mosaic image to be constructed into one or more areas, wherein each area corresponds to information about an object. For example, referring to FIG. 16, a template may be segmented into three areas, wherein the three areas may respectively correspond to objects of sky, trees, and water. Such segmentation into areas and mapping of objects corresponding to the respective areas may be determined variously, and may be selected or input by a user.

Referring to FIG. 16, a method of constructing a mosaic image using a template will be described.

Referring to FIG. 16, the source image generation module 1520 may generate a source image corresponding to each sub area of an input empty image using, as a condition, information about a template.

For example, when the source image generation module 1520 generates a source image corresponding to a sub area SB1 of the sub areas obtained by segmenting the input empty image, the source image generation module 1520 may receive object information from an area corresponding to the sub area SB1 in the template. Because an object of the area corresponding to the sub area SB1 in the template is sky, the source image generation module 1520 may receive object information sky, and generate a source image using sky as a condition. That is, when the condition sky is received, the source image generation module 1520 may generate a source image S1 corresponding to sky and locate the source image S1 at a position corresponding to the sub area SB1 in an area of a mosaic image.

For example, when the source image generation module 1520 attempts to generate a source image corresponding to a sub area SB2 of the sub areas obtained by segmenting the input empty image, the source image generation module 1520 may receive object information from an area corresponding to the sub area SB2 in the template. Because an object of the area corresponding to the sub area SB2 in the template is trees, the source image generation module 1520 may receive object information trees, and generate a source image using trees as a condition. That is, when the condition trees is received, the source image generation module 1520 may generate a source image S2 corresponding to trees and locate the source image S2 at a position corresponding to the sub area SB2 in the area of the mosaic image.

For example, when the source image generation module 1520 attempts to generate a source image corresponding to a sub area SB3 of the sub areas obtained by segmenting the input empty image, the source image generation module 1520 may receive object information from an area corresponding to the sub area SB3 in the template. Because an object of the area corresponding to the sub area SB3 in the template is water, the source image generation module 1520 may receive object information water, and generate a source image using water as a condition. That is, when the condition water is received, the source image generation module 1520 may generate a source image S3 corresponding to water and locate the source image S3 at a position corresponding to the sub area SB3 in the area of the mosaic image.

By segmenting an input empty image into a plurality of sub areas, generating source images using, as conditions, objects of a template, corresponding to the segmented sub areas, and locating the generated source images at positions of the corresponding sub areas, a mosaic image to which a user's desired template is reflected may be constructed.

Through the above-described operation, by generating source images based on a template even when there is no input image, a mosaic image with a user's desired composition may be constructed.

According to an embodiment of the disclosure, when a mosaic image is constructed based on a template, source images may be generated using esthetics scores.

Figure 17:
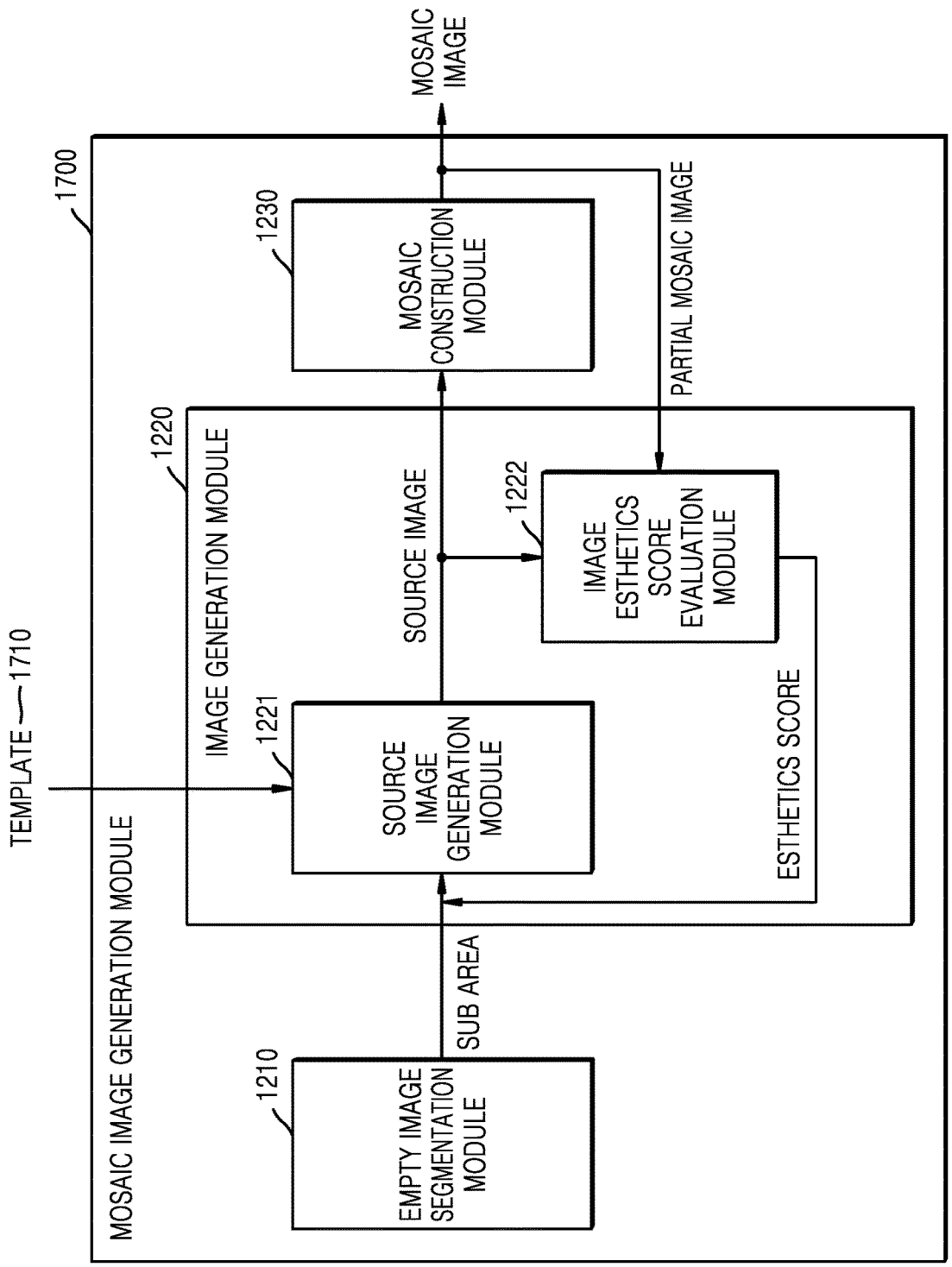
FIG. 17 is a block diagram illustrating an example mosaic image generation apparatus further considering esthetics scores when constructing a mosaic image based on a template, according to an embodiment of the disclosure.

FIG. 17 is a block diagram illustrating an example mosaic image generation apparatus of further considering esthetics scores when constructing a mosaic image based on a template, according to an embodiment of the disclosure.

Referring to FIG. 17, the mosaic image generation module 1700 shown in FIG. 17 is the same as or similar to the mosaic image generation module 1200 shown in FIG. 12, except that the source image generation module 1221 generates a source image by further considering a template 1710. The mosaic image generation module 1700 shown in FIG. 17 is similar to the mosaic image generation module 1200 shown in FIG. 12, and descriptions overlapping with those given above with reference to FIG. 12 will be omitted.

The mosaic image generation module 1700 may include the empty image segmentation module 1210, the source image generation module 1221, the image esthetics score evaluation module 1222, and the mosaic construction module 1230. Operations of the empty image segmentation module 1210, the image esthetics score evaluation module 1222, and the mosaic construction module 1230 have been described above with reference to FIG. 12, and therefore, descriptions thereof will not be repeated here.

The source image generation module 1221 of the mosaic image generation module 1700 may generate a source image by further using, as a condition, object information of a template of a sub area corresponding to the source image to be currently generated, as well as an esthetics score of the previous source image. That is, the source image generation module 1221 may generate source images corresponding to sub areas basically according to object information of a template, and may also further reflect esthetics scores of previously generated source images to the source images such that the source images have esthetics that are more similar to those of the previously generated source images. For example, when a template object corresponding to a sub area is tree, the source image generation module 1221 may generate a source image corresponding to tree such that the source image is more similar to esthetics of the previously generated source images.

Figure 18:
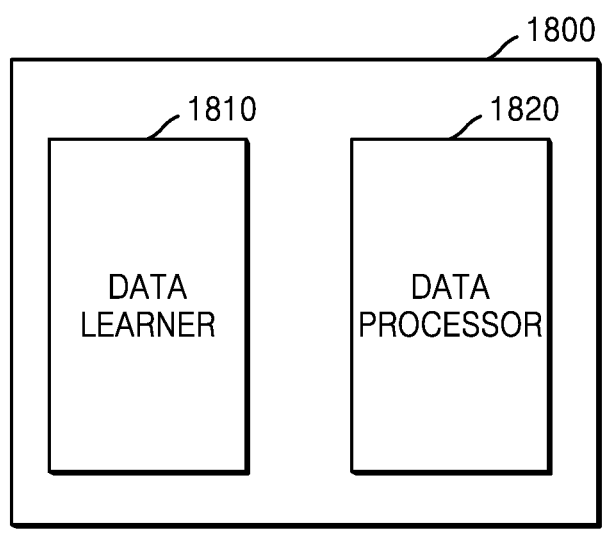
FIG. 18 is a block diagram illustrating example training and processing of a neural network in a configuration of a processor according to an embodiment of the disclosure.

FIG. 18 is a block diagram illustrating example training and processing of a neural network in a configuration of a processor 1800 according to an embodiment of the disclosure.

Referring to FIG. 18, the processor 1800 according to an embodiment of the disclosure may include a data learner (e.g., including various processing circuitry and/or executable program elements) 1810 and a data processor (e.g., including various processing circuitry and/or executable program elements) 1820.

The data learner 1810 may extract one or more features from an input image, and learn a criterion for generating a source image using, as a condition, the extracted one or more features, to train a neural network according to an embodiment of the disclosure.

The data learner 1810 may learn a criterion for generating a source image using, as a condition, an esthetics score of the previous source image, to train the neural network according to an embodiment of the disclosure.

The data learner 1810 may learn a criterion for generating a source image using, as a condition, a template object corresponding to a sub area, to train the neural network according to an embodiment of the disclosure.

Data processing models may be constructed in consideration of application fields of recognition models, purposes of learning, computing performance of the apparatus, etc. The data processing models may be, for example, models based on a neural network. For example, each data processing model may be a Deep Neural Network (DNN), a Recurrent Neural Network (RNN), or a Bidirectional Recurrent Deep Neural Network (BRDNN), although not limited thereto.

The data learner 1810 may train the data processing models using a learning algorithm including, for example, error back-propagation or gradient descent.

The data learner 1810 may learn the data processing models through, for example, supervised learning using, as input values, training data. Also, the data learner 1810 may train the data processing models through, for example, unsupervised learning finding a criterion for data processing by self-learning a type of data required for data processing without supervision. Also, the data learner 1810 may train the data processing models through, for example, reinforcement learning using a feedback about whether a result value obtained by learning is correct.

After data processing models are trained, the data learner 1810 may store the trained data processing models. In this case, the data learner 1810 may store the trained data processing models in a memory of the computing apparatus 100. Alternatively, the data learner 1810 may store the trained data processing models in a memory of a server connected to the computing apparatus 100 through a wired or wireless network.

The data processor 1820 may input a sub area image of an image to a data processing model including a trained neural network, and the data processing model may output a source image corresponding to the sub area image as a result value. The output result value may be used to update the data processing model including the neural network.

The data processor 1820 may input an esthetic score of a previous source image to the data processing model including the trained neural network, and the data processing model may output a current source image as a result value. The output result value may be used to update the data processing model including the neural network.

The data processor 1820 may input template object information corresponding to a sub area resulting from segmenting an empty image to the data processing model including the trained neural network, and the data processing model may output a source image as a result value. The output result value may be used to update the data processing model including the neural network.

At least one of the data learner 1810 or the data processor 1820 may be manufactured in a form of at least one hardware chip and installed in the computing apparatus 100. For example, at least one of the data learner 1810 or the data processor 1820 may be manufactured in a form of a dedicated hardware chip for artificial intelligence (AI) or as a part of an existing general-purpose processor (for example, a CPU or AP) or a graphics-dedicated processor (for example, a GPU), and installed in the computing apparatus 100.

The data learner 1810 may provide model information established by itself to the data processor 1820 in a wired or wireless manner, and the data processor 1820 may provide data received by itself as additional training data to the data learner 1810 in a wired or wireless manner.

At least one of the data learner 1810 or the data processor 1820 may be implemented as a software module. When at least one of the data learner 1810 or the data processor 1820 is implemented as at least one software module (or a program module including an instruction), the software module may be stored in non-transitory computer readable media. Also, in this case, the at least one software module may be provided by operating system (OS) or a predefined application. Alternatively, a part of the at least one software module may be provided by OS and the remaining part may be provided by a predefined application.

The data learner 1810 and the data processor 1820 may be installed in the same computing apparatus or different computing apparatuses. For example, one of the data learner 1810 and the data processor 1820 may be included in a computing apparatus, and the other one may be included in a server.

According to an example, the data learner 1810 and the data processor 1820 may be installed in a user computing apparatus, and perform both learning and data processing in the user computing apparatus.

According to an example, the data learner 1810 may be installed in a server to be trained, and the data processor 1820 including a completely trained model may be installed in a user computing apparatus.

Figure 19A:
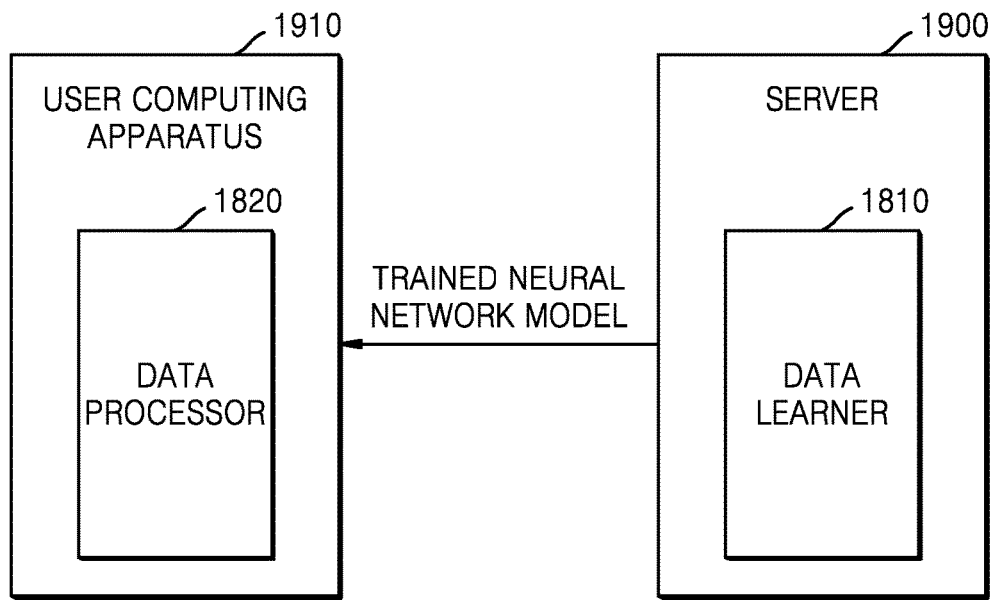
FIG. 19A is a block diagram illustrating an example in which a data learner is installed in a server and a data processor is installed in a user computing apparatus, according to an embodiment of the disclosure.

FIG. 19A is a diagram illustrating an example in which the data learner 1810 is installed in a server 1900 and the data processor 1820 is installed in a user computing apparatus 1910, according to an embodiment of the disclosure.

Referring to FIG. 19A, the server 1900 may use the data learner 1810 to learn a method of generating a source image constructing a mosaic image according to a method disclosed in the disclosure, thereby obtaining an image generation neural network model. Then, the server 1900 may provide the trained image generation neural network model to the user computing apparatus 1910. The user computing apparatus 1910 may implement the data processor 1820 using the trained image generation neural network model received from the server 1900. When a user attempts to generate a mosaic image, the user computing apparatus 1910 may generate a mosaic image according to a request from the user using the data processor 1820 installed therein without having to communicate with the server 1900, and output the mosaic image to a display of the user computing apparatus 1910.

Figure 19B:
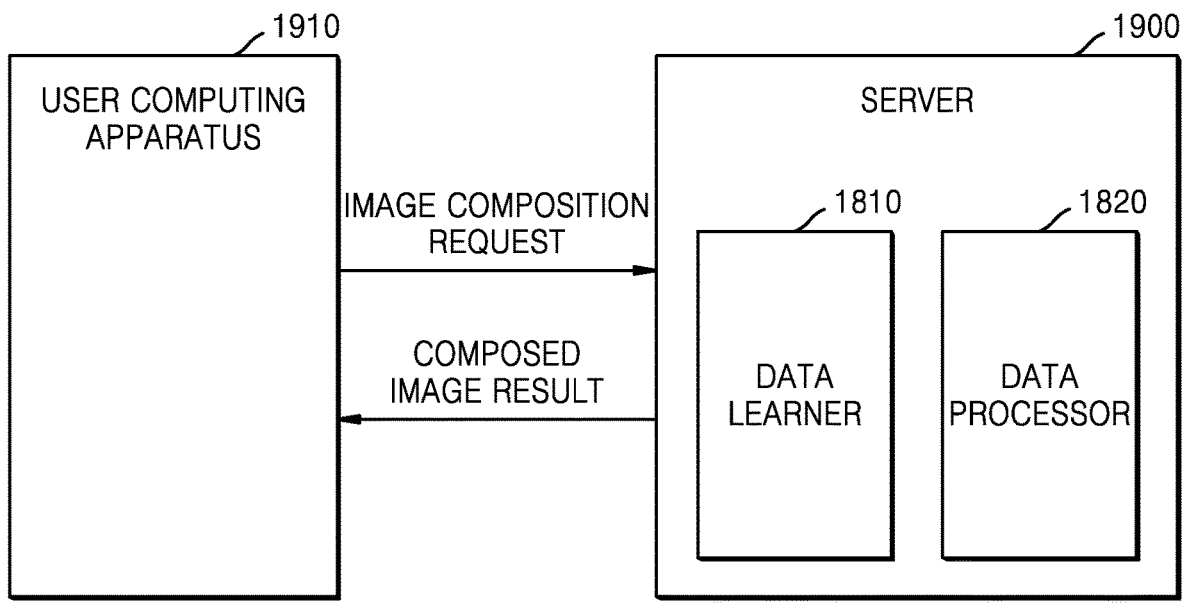
FIG. 19B is a diagram illustrating an example in which both a data learner and a data processor are installed in a server, according to an embodiment of the disclosure.

FIG. 19B is a diagram illustrating an example in which both the data learner 1820 and the data processor 1810 are installed in the server 1900, according to an embodiment of the disclosure.

Referring to FIG. 19B, both the data learner 1810 and the data processor 1820 may be installed in the server 1900. Accordingly, the server 1900 may use the data learner 1810 to learn a method of generating a source image constructing a mosaic image according to the method disclosed in the disclosure to obtain an image generation neural network model, and implement the data processor 1820 using the obtained image generation neural network model.

When a user attempts to generate a mosaic image, the user computing apparatus 1910 may transfer an image generation request to the server 1900. Then, the server 1900 may generate a mosaic image according to the image generation request from the user using the data processor 1820, and transfer the mosaic image to the user computing apparatus 1910 such that the mosaic image is displayed on a display of the user computing apparatus 1910.

A method of operating the computing apparatus according to an embodiment of the disclosure may be implemented in a program command form that can be executed by various computer means, and may be recorded on non-transitory computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as CD-ROM and DVD, magneto-optical media such as floptical disks, and hardware devices, such as ROM, RAM, flash memory, and the like, specifically configured to store and execute program commands. Examples of the program commands include high-level language codes or instructions that can be executed on a computer through an interpreter or the like, as well as machine language codes produced by a compiler. The instructions may include a code made by a compiler or a code executable by an interpreter.

According to various embodiments of the disclosure, by providing a computing apparatus and method capable of generating a mosaic image using a base image without using source images, many source images may not need to be prepared to generate a mosaic image. Therefore, convenience of use may increase, and also, because source images are generated using a neural network, a more natural mosaic image may be generated than when existing source images are used.

According to various embodiments of the disclosure, by providing a computing apparatus and method capable of generating a mosaic image without using any base image as well as source images, many source images may not need to be prepared to generate a mosaic image, and, because a base image does also not need to be prepared, convenience of use may further increase.

According to various embodiments of the disclosure, by providing a computing apparatus and method capable of generating a mosaic image using a template of the mosaic image to be generated without using any base image as well as source images, a mosaic image may be automatically generated according to a desired template provided from a user.

While the disclosure has been illustrated and described with reference to various example embodiments, it will be understood that the various example embodiments are intended to be illustrative, not limiting. It will also be understood by one of ordinary skill in the art that various changes in form and details may be made without departing from the true spirit and full scope of the disclosure, including the following claims.

What is claimed is:

1. A computing apparatus comprising:
a memory storing one or more instructions; and
a processor configured to execute the one or more instructions stored in the memory to:
obtain a plurality of sub area images by segmenting an input image into a plurality of sub areas,
extract a feature from each of the plurality of sub area images and generate feature vectors corresponding to the extracted features of the plurality of sub area images,
generate a plurality of source images respectively corresponding to the plurality of sub areas using an image generation neural network, wherein each source image of the plurality of source images is generated using an image generation neural network using, as a condition, the feature vector from each of the plurality of sub area images to generate the source images including a feature designated by the respective feature vector, and
generate a mosaic image at least by locating each source image of the plurality of source images at the corresponding sub area.

2. The computing apparatus of claim 1, wherein the processor is further configured to execute the one or more instructions to: extract the feature of each of the plurality of sub area images from each of the plurality of sub area images and generate the feature vectors for the plurality of sub area images using a feature extraction neural network.

3. The computing apparatus of claim 2, wherein the feature of each of the plurality of sub area images includes at least one of color, texture, or geometric information.

4. The computing apparatus of claim 1, wherein the image generation neural network includes a generative adversarial network (GAN).

5. A computing apparatus comprising:
a memory storing one or more instructions; and
a processor configured to execute the one or more instructions stored in the memory to:
segment an area of an empty image including no content into a plurality of sub areas,
generate a plurality of source images respectively corresponding to the plurality of sub areas, wherein each source image of the plurality of source images is generated using an image generation neural network, and
generate a mosaic image by locating each source image of the plurality of source images at the corresponding sub area,
wherein to generate the plurality of source images the processor is configured to execute the one or more instructions stored in the memory to:
generate a first source image of the plurality of source images corresponding to a first sub area of the plurality of sub areas using the image generation neural network without the image generation neural network using a condition related to esthetics of other images of the plurality of source images,
after generating the first source image, obtain an esthetics score of a previously generated source image at least by evaluating esthetics of the previously generated source image, and
generate other source images of the plurality of source images respectively corresponding to the plurality of sub areas using the image generation neural network, wherein each of other source image of the plurality of source images is generated using the image generation neural network using, as a condition, the esthetics score of the previously generated source image of the plurality of source images.

6. The computing apparatus of claim 5, wherein the processor is further configured to execute the one or more instructions to: evaluate, based on obtaining the esthetics score of the previously generated source image, the esthetics of the previously generated source image based on the previously generated source image and a partially completed mosaic image.

7. A computing apparatus comprising: a memory storing one or more instructions; and
a processor configured to execute the one or more instructions stored in the memory to:
receive a template representing a composition of a mosaic image to be generated,
segment an area of an empty image including no content into a plurality of sub areas,
generate a plurality of source images respectively corresponding to the plurality of sub areas using an image generation neural network, wherein each source image of the plurality of source images is generated using the image generation neural network using, as a condition, information about the template, and
generate a mosaic image by locating each source image of the plurality of source images at the corresponding sub area,
wherein to generate the plurality of source images the processor is configured to execute the one or more instructions stored in the memory to:
generate a first source image of the plurality of source images corresponding to a first sub area of the plurality of sub areas using the image generation neural network without the image generation neural network using a condition related to esthetics of other images of the plurality of source images,
after generating the first source image, obtain an esthetics score of a previously generated source image by evaluating esthetics of the previously generated source image, and
generate other source images of the plurality of source images respectively corresponding to the plurality of sub areas using the image generation neural network, the image generation neural network using, as a condition, the esthetics score of the previously generated source image of the plurality of source images.

8. The computing apparatus of claim 7, wherein the information about the template includes object information corresponding to each of the plurality of sub areas in the template.

9. The computing apparatus of claim 7, wherein the template is a user designated template.

10. A method of operating a computing apparatus, comprising:
- obtaining a plurality of sub area images by segmenting an input image into a plurality of sub areas;
- extracting a feature from each of the plurality of sub area images and generating feature vectors corresponding to the extracted features of the plurality of sub area images;
- generating a plurality of source images respectively corresponding to the plurality of sub areas using an image generation neural network, wherein each source image of the plurality of source images is generated using the image generation neural network using, as a condition, the feature vector from each of the plurality of sub area images to generate the source images including a feature designated by the respective feature vector; and
- generating a mosaic image by locating each source image of the plurality of source images at the corresponding sub areas.

11. The method of claim 10, further comprising extracting the feature of each of the plurality of sub area images from each of the plurality of sub area images and generating the feature vectors for the plurality of sub area images using a feature extraction neural network.

12. The method of claim 11, wherein the feature of each of the plurality of sub area images includes at least one of color, texture, or geometric information.

13. The method of claim 10, wherein the image generation neural network includes a generative adversarial network (GAN).

14. A method of operating a computing apparatus, comprising:
- segmenting an area of an empty image including no content into a plurality of sub areas;
- generating a plurality of source images respectively corresponding to the plurality of sub areas using an image generation neural network, wherein each source image of the plurality of source images is generated using the image generation neural network; and
- generating a mosaic image by locating each source image of the plurality of source images at the corresponding sub area, wherein the generating the plurality of source images comprises:
  - generating a first source image of the plurality of source images corresponding to a first sub area of the plurality of sub areas using the image generation neural network without the image generation neural network using a condition related to esthetics of other images of the plurality of source images,
  - after generating the first source image, obtaining an esthetics score of a previously generated source image by evaluating esthetics of the previously generated source image, and
  - generating other source images of the plurality of source images respectively corresponding to the plurality of sub areas using the image generation neural network, the image generation neural network using, as a condition, the esthetics score of the previously generated source image of the plurality of source images.

15. The method of claim 14, further comprising, based on obtaining the esthetics score of the previously generated source image, evaluating the esthetics of the previously generated source image based on the previously generated source image and a partially completed mosaic image.

16. A method of operating a computing apparatus, comprising:
- receiving a template representing a composition of a mosaic image to be generated;
- segmenting an area of an empty image including no content into a plurality of sub areas;
- generating a plurality of source images respectively corresponding to the plurality of sub areas using an image generation neural network, wherein each source image of the plurality of source images is generated using the image generation neural network using, as a condition, information about the template; and
- generating a mosaic image by locating each source image of the plurality of source images at the corresponding to sub area,
wherein the generating the plurality of source images comprises:
  - generating a first source image of the plurality of source images corresponding to a first sub area of the plurality of sub areas using the image generation neural network without the image generation neural network using a condition related to esthetics of other images of the plurality of source images,
  - after generating the first source image, obtaining an esthetics score of a previously generated source image by evaluating esthetics of the previously generated source image, and
  - generating other source images of the plurality of source images respectively corresponding to the plurality of sub areas using the image generation neural network, the image generation neural network using, as a condition, the esthetics score of the previously generated source image of the plurality of source images.

17. The method of claim 16, wherein the information about the template includes object information corresponding to each of the plurality of sub areas in the template.

18. The method of claim 16, wherein the template is a user designated template.

19. A non-transitory computer-readable recording medium having stored thereon a program which, when executed, causes a computing apparatus to perform operations, the operations comprising:
- obtaining a plurality of sub area images by segmenting an input image into a plurality of sub areas;
- extracting a feature from each of the plurality of sub area images and generating feature vectors corresponding to the extracted features of the plurality of sub area images;
- generating a plurality of source images respectively corresponding to the plurality of sub areas using an image generation neural network, wherein each source image of the plurality of source images is generated using the image generation neural network using, as a condition, the feature vector from each of the plurality of sub area images to generate the source images including a feature designated by the respective feature vector; and
- generating a mosaic image by locating each source image of the plurality of source images at the corresponding sub areas.

20. The computing apparatus of claim 1, wherein the processor is further configured to execute the one or more instructions to: extract the feature of each of the plurality of sub area images from each of the plurality of sub area images and generate the feature vectors for the plurality of sub area images using a feature extraction neural network, the extracted feature of each of the plurality of sub area images including color information, texture information, and geometric information of the sub area images.

* * * * *